(12) United States Patent
Serobian et al.

(10) Patent No.: US 7,378,382 B2
(45) Date of Patent: May 27, 2008

(54) RHEOLOGICALLY STABILIZED SILICONE DISPERSIONS COMPRISING A POLYDIMETHYLSILOXANE MIXTURE

(75) Inventors: Ashot K. Serobian, Pleasanton, CA (US); Julio C. Cardozo, Pleasanton, CA (US); Danielle J. Coutts, Pleasanton, CA (US); Daniela N. Fritter, Pleasanton, CA (US); Adam F. Gross, Pleasanton, CA (US); Mona Marie Knock, Pleasanton, CA (US); Frederick R Van Wort, III, Pleasanton, CA (US); Tarric M. El-Sayed, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 344 days.

(21) Appl. No.: 10/840,477

(22) Filed: May 5, 2004

(65) Prior Publication Data

US 2005/0250668 A1   Nov. 10, 2005

(51) Int. Cl.
*C11D 9/36* (2006.01)
*C11D 3/37* (2006.01)

(52) U.S. Cl. .......... 510/466; 510/243; 510/244; 510/245; 510/275; 510/417; 510/434; 510/477

(58) Field of Classification Search ........ 510/243, 510/244, 245, 275, 417, 434, 466, 477
See application file for complete search history.

(56) References Cited

U.S. PATENT DOCUMENTS

| | | | |
|---|---|---|---|
| 3,462,384 A * | 8/1969 | Kokoszka et al. ..... 106/287.14 |
| 3,720,538 A | 3/1973 | Bergmeister et al. ......... 117/72 |
| 3,929,492 A * | 12/1975 | Chapman et al. .............. 106/3 |
| 4,023,978 A | 5/1977 | Messina ................... 106/211.1 |
| 4,347,151 A * | 8/1982 | Lohr et al. ................... 510/398 |
| 4,497,919 A | 2/1985 | Varga et al. ................... 524/10 |
| 4,902,499 A * | 2/1990 | Bolish et al. ............ 424/70.12 |
| 5,236,624 A | 8/1993 | Lepert et al. ................ 252/314 |
| 5,254,284 A * | 10/1993 | Barone et al. .............. 510/181 |
| 5,433,890 A | 7/1995 | Meyer et al. ................ 252/309 |
| 5,543,074 A * | 8/1996 | Hague et al. ................ 510/122 |
| 5,554,313 A * | 9/1996 | Chandler ..................... 510/121 |
| 5,645,751 A * | 7/1997 | Haley ......................... 252/8.91 |
| 5,753,607 A * | 5/1998 | Burke et al. ................. 510/242 |
| 5,824,723 A * | 10/1998 | Yano et al. .................. 524/262 |
| 5,866,532 A * | 2/1999 | Jackson et al. ............. 510/466 |
| 5,977,038 A * | 11/1999 | Birtwistle et al. .......... 510/122 |
| 6,114,299 A | 9/2000 | Hunter et al. ............... 510/466 |
| 6,117,830 A * | 9/2000 | Yokosuka et al. .......... 510/242 |
| 6,165,479 A | 12/2000 | Wheeler ..................... 424/400 |
| 6,221,433 B1 | 4/2001 | Muntz et al. ................ 427/387 |
| 6,221,833 B1 * | 4/2001 | Colurciello, Jr. .......... 510/466 |
| 6,277,360 B1 * | 8/2001 | Carew et al. ............. 424/70.12 |
| 6,506,715 B1 * | 1/2003 | Schultz et al. ............. 510/189 |
| 6,583,103 B1 * | 6/2003 | Klinkhammer ............. 510/478 |
| 6,616,934 B1 | 9/2003 | Hill et al. ................... 424/401 |
| 6,656,975 B1 | 12/2003 | Christiano et al. ............ 516/22 |
| 6,759,377 B2 * | 7/2004 | Hackenthal et al. ........ 510/197 |
| 6,809,145 B1 * | 10/2004 | Okamura et al. ........... 524/497 |
| 6,827,795 B1 * | 12/2004 | Kasturi et al. ................ 134/42 |
| 6,881,757 B2 * | 4/2005 | Moodycliffe et al. .......... 516/6 |
| 6,930,080 B2 * | 8/2005 | Moodycliffe et al. ....... 510/295 |
| 2002/0001605 A1 * | 1/2002 | Carew et al. ............... 424/405 |
| 2003/0022799 A1 * | 1/2003 | Alvarado et al. ........... 510/119 |
| 2003/0110976 A1 | 6/2003 | Adibh et al. .................... 106/2 |
| 2003/0119917 A1 | 6/2003 | Fey et al. ...................... 516/13 |
| 2003/0143179 A1 * | 7/2003 | Cao et al. ................. 424/70.13 |
| 2004/0016364 A1 | 1/2004 | Legrow et al. ................. 106/2 |
| 2005/0164898 A1 * | 7/2005 | Kasturi et al. .............. 510/237 |

FOREIGN PATENT DOCUMENTS

CA       1176828       10/1984

* cited by examiner

*Primary Examiner*—Charles I Boyer
(74) *Attorney, Agent, or Firm*—Erin Collins

(57) ABSTRACT

Aqueous dispersions of silicone oils are prepared without the need for surfactants, solvents, hydrotropes or emulsifiers by employing water soluble and/or water dispersible polymers providing inventive compositions which exhibit a rheological Critical Strain value greater than zero and less than about 0.5. Disclosed according to the present invention are compositions and methods of use of the aqueous dispersions of silicone fluids for cleaning, preserving, protecting, and otherwise treating a variety of surfaces, including household surfaces, such as floors, counter tops, furniture, walls, and automotive surfaces, such as tires, rubber, vinyl, upholstery, fabric, plastic and general elastomer surfaces.

24 Claims, 1 Drawing Sheet

RHEOLOGICALLY STABILIZED SILICONE DISPERSIONS COMPRISING A POLYDIMETHYLSILOXANE MIXTURE

BACKGROUND OF THE INVENTION

1. Field of the Invention

This invention relates generally to aqueous dispersions of silicone oils prepared using water soluble and/or water dispersible polymers providing inventive compositions which exhibit a rheological Critical Strain value greater than zero and less than about 0.5. Aqueous dispersions of silicone oils are prepared without the need for surfactants, solvents, hydrotropes or emulsifiers by employing water soluble and/or water dispersible polymers providing inventive compositions which exhibit a rheological Critical Strain value greater than zero and less than about 0.5. Disclosed according to the present invention are compositions and methods of use of the aqueous dispersions of silicone fluids for cleaning, preserving, protecting, and otherwise treating a variety of surfaces, including household surfaces, such as floors, counter tops, furniture, walls, and automotive surfaces, such as tires, rubber, vinyl, upholstery, fabric, plastic and general elastomer surfaces. Disclosed according to the present invention are compositions and methods of use of the aqueous dispersions of silicone fluids prepared using water soluble and/or water dispersible polymers providing inventive compositions which exhibit a rheological Critical Strain value greater than zero and less than about 0.5 and an Elastic Modulus value greater than zero and less than about 400 Pascals.

2. Description of the Related Art

A typical approach in the art for producing stable compositions containing silicones is by forming an emulsified phase or emulsion of the silicone oil in water through the use of emulsifying agents such as surfactants, solvents, hydrotropes and their respective mixtures combined with high-shear mixing conditions to obtain a particle size of the silicone oil small enough for reasonable storage stability and preventing gross separation of the silicone oil droplets resulting in formation of a separate silicone phase. Current equipment and procedures are only able to reduce the average particle size to about 3-10 microns in surfactant-based emulsions, and inherent to high shear processing is the potential degradation of other additives, particularly longer chain polymers, and contribution to localized heating effects during processing that can further degrade heat-sensitive ingredients, such as fragrances, preservatives and the like. Further, high shear mixing processes bring the introduction of unwanted air into the formulation, creating changes in density and leading to problems with reproducibility of the manufacturing process and instability of the product, as well as handling issues due to excessive foaming.

The use of emulsifying surfactants is also problematic with regards to the intended end use of the silicone emulsions, which are employed for cleaning, preserving and protecting surfaces achieved through deposition of the silicone material in the form of a thin coating onto the treated surface. The level of emulsifying surfactant required in the compositions to produce storage stable emulsions are typically large with respect to the level of surfactant required for cleaning action and necessarily must be present at some significantly high ratio with respect to the silicone oil in order to effect a stable emulsion. Thus, some surfactant necessarily remains in the silicone phase deposited on the treated surface resulting in undesirable characteristics both from an aesthetic and functional perspective, particularly since the surfactant employed is advantageously selected for its emulsifying capability rather than another benefit such as for wetting or cleaning purposes. Surfactant based silicone emulsions used in surface treatment applications thus tend to suffer from undesirable characteristics, such as reduced shine, reduced coating longevity, increased susceptibility to hydration by water and/or high humidity, susceptibility to rinse-off by water, increased stickiness to the treated surface leading to dust pickup, retention of fingerprints and the like, owing to the surfactant employed as emulsifier.

Alternative approaches in the art for emulsifying silicone oils include the use of solvents and hydrotropes, alone and in combination with emulsifying surfactants, in order to achieve emulsification of the silicones. Solvents are not without their own issues, for instance those that fall in the class of volatile organic compounds, are subject to ever increasing regulatory compliance issues. While volatile solvents evaporate after application, the resulting films suffer less from the detrimental effects of the correspondingly reduced or replaced surfactant emulsifiers present. However, in general solvents are often flammable, aggressive to the substrates to which the silicone compositions are applied, require special packaging and handling requirements, and limit formulation options such as including other beneficial ingredients to the compositions that are not solvent compatible. Generally, high solvent and/or hydrotrope level and solvents and hydrotropes capable of coupling the silicone oil to water are required, with similar issues to the emulsifying surfactants as described above owing to their incorporation into the resulting silicone film deposited onto the treated surface.

Further, the emulsions formed in prior practice achieve a high degree of stability with regards to storage conditions, temperature and time typically required for practical use. However, the inherent stability of these emulsions can result in lowered performance owing to the inability of the emulsions to break, that is to release the emulsified silicone oils, at time of use so that the silicone oils are available to coat the intended target surface or substrate. It is desirable to coat or treat the surface with a layer of essentially pure silicone oil, or alternatively with silicone oil without significant or otherwise detrimental levels of emulsifying agents, rather than to provide a coating or layer of emulsified silicone oil with extraneous components present that not only do not contribute to the desired protective benefits, but may detract from these protective benefits.

To over come some of the negative effects of the emulsifiers commonly employed, higher levels of the silicone oils are typically required for the formulations to exhibit the desired preserving, protecting and aesthetic benefits to treated surfaces such as those disclosed herein. In essence, a high silicone oil level, typically in amounts exceeding 20% by weight, and often greater than 30% by weight, are usually employed in practice to overcome the poorer performance of the prior art emulsions of silicone oils for these purposes.

Accordingly, there is a need in the art for improved silicone oil based compositions which will provide a beneficial cleaning, protecting, preserving and otherwise restorative effect to surfaces, as well as imparting desirable gloss or shine to a treated surface without the need for extraneous emulsifying or solubilizing materials such as emulsifying surfactants, solvents or hydrotropes.

SUMMARY OF THE INVENTION

In accordance with the above objects and those that will be mentioned and will become apparent below, one aspect of the present invention is the discovery of how to prepare aqueous dispersions of silicone fluids using selected rheologically modifying polymers. The inventive compositions provide excellent cleaning, preservation, protection and treatment of leather, rubber, synthetic plastic, vinyl and elastomeric surfaces to enhance their appearance. The aqueous dispersions of silicone fluids are prepared without the need for emulsifiers such as surfactants, solvents, emulsifiers, hydrotropes or the like, by employing water soluble and/or water dispersible polymers providing inventive compositions which exhibit a Theological Critical Strain value greater than zero and less than about 0.5.

In one embodiment of the present invention, an aqueous dispersion of a silicone fluid and a polymer are provided that exhibit a rheological Critical Strain value greater than zero and less than about 0.5.

In another embodiment of the present invention, an aqueous dispersion of a silicone fluid and a polymer are provided that exhibit a rheological Critical Strain value greater than zero and less than about 0.5 and an Elastic Modulus value of less than about 400 Pascals as measured in the Linear Viscoelastic Region.

In another embodiment of the present invention, an aqueous dispersion of a silicone fluid and a polymer that provides rheological structuring properties of selected Critical Strain and Elastic Modulus values is provided for cleaning, preserving, protecting, and otherwise treating leather, rubber, synthetic plastic, vinyl, elastomeric, fabric, fiber, metal, stone and related household and automotive surfaces to enhance their appearance.

In another embodiment of the present invention, an aqueous dispersion of a silicone fluid and a polymer that provides rheological structuring properties of selected Critical Strain and Elastic Modulus values is provided in the form of a neat liquid, spray, aerosol, foam or liquid associated with a porous carrier substrate such as a wipe, sponge or towelette for cleaning, preserving, protecting, and otherwise treating leather, rubber, synthetic plastic, vinyl, elastomeric, fabric, fiber, metal, stone and related household and automotive surfaces to enhance their appearance In another embodiment of the present invention, a process is provided whereby an aqueous dispersion of a silicone fluid and a polymer that provides rheological structuring properties of selected Critical Strain and Elastic Modulus values is employed for cleaning, preserving, protecting, and otherwise treating leather, rubber, synthetic plastic, vinyl, elastomeric, fabric, fiber, metal, stone and related household and automotive surfaces to enhance their appearance.

In yet another embodiment of the present invention, an aqueous dispersion of a silicone fluid and a polymer selected from the group consisting of water soluble and water dispersible polyacrylate polymers and copolymers containing at least one acrylate monomer, water swellable and alkali swellable polyacrylate polymers and copolymers containing at least one acrylate monomer, non-linear polyacrylate polymers cross-linked with at least one polyalkenyl polyether monomer, film-forming and water swellable non-soluble polyacrylate polymers, hydrophobically modified cross-linked polyacrylate polymers and copolymers containing at least one hydrophobic monomer, water dispersible associative and non-associative polyacrylate polymers and copolymers containing at least one acrylate monomer, and mixtures thereof, is provided that exhibits a rheological Critical Strain value greater than zero and less than about 0.5 and a Elastic Modulus value of less than about 400 Pascals as measured in the Linear Viscoelastic Region.

In yet another embodiment of the present invention, a method of use employing the compositions of the present invention for cleaning, preserving, protecting, and otherwise treating leather, rubber, synthetic plastic, vinyl, elastomeric, fabric, fiber, metal, stone and related household and automotive surfaces to enhance their appearance is provided.

Further features and advantages of the present invention will become apparent to those of ordinary skill in the art in view of the detailed description of exemplary embodiments below, when considered together with the attached drawings and claims.

BRIEF DESCRIPTION OF THE DRAWINGS

The foregoing aspects and others will be readily appreciated by the skilled artisan from the following description of illustrative embodiments when read in conjunction with the accompanying drawings.

Figure 1:
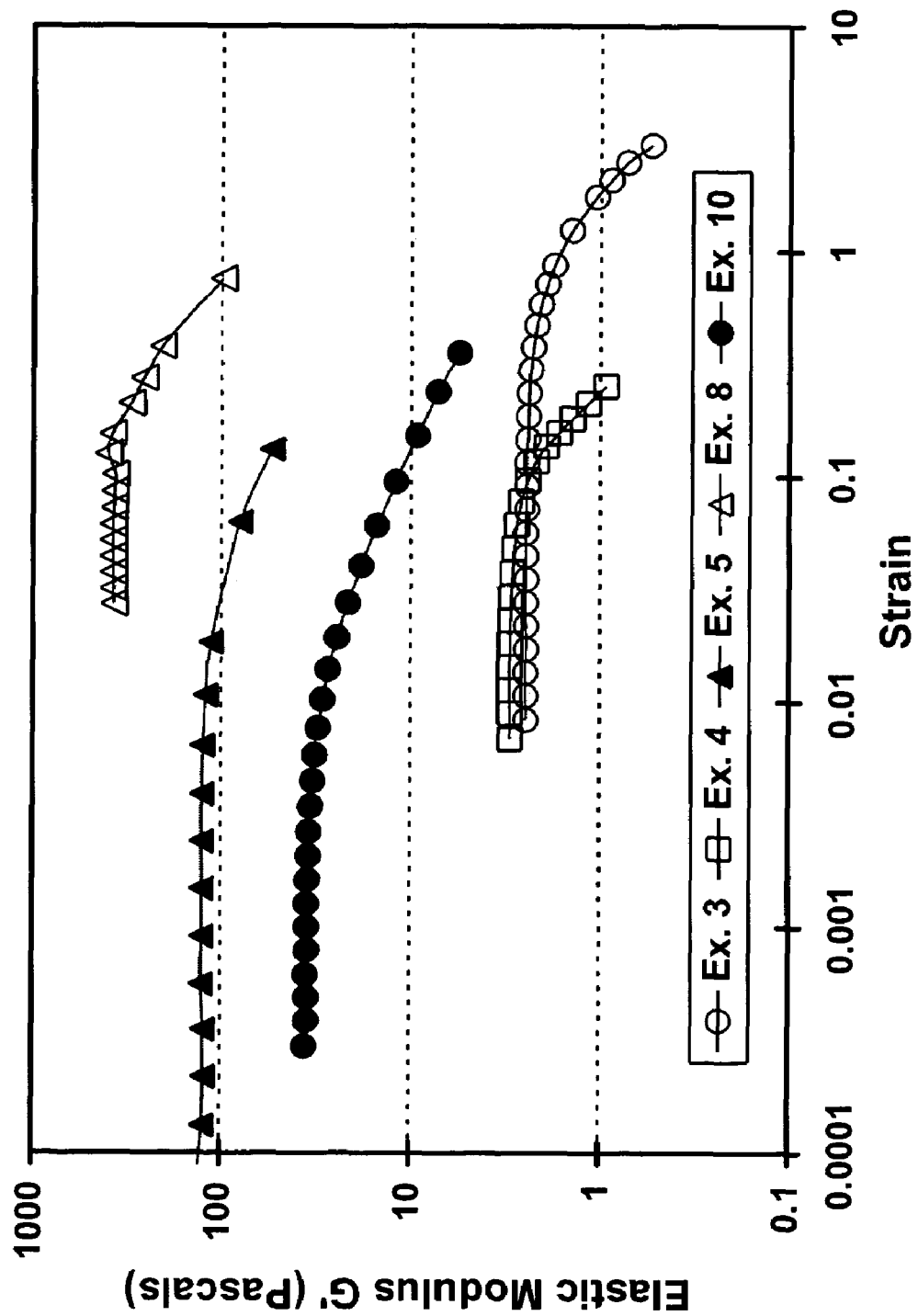
FIG. 1 shows a plot of the Elastic Modulus Value (G', in Pascals) as a function of strain from a rheological stress sweep measurement for example (ex. numbers as shown for each data curve) compositions representing selected embodiments of the present invention. The data curves show embodiments of the present invention that exhibit a range of Critical Strain Values ($\gamma_o$) which is the strain at the point at which the Elastic Modulus decreases from the constant value exhibited in the linear viscoelastic region. The corresponding numerical values of these rheological parameters and corresponding example compositions of the inventive embodiments are also presented in Table I.

These and other objects and advantages of the present invention will become more fully apparent from the following description taken in conjunction with the accompanying examples of embodiments of the present invention.

DETAILED DESCRIPTION

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to a "surfactant" includes two or more such surfactants.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the exemplary materials and methods are described herein.

In the application, effective amounts are generally those amounts listed as the ranges or levels of ingredients in the descriptions, which follow hereto. Unless otherwise stated, amounts listed in percentage ("%'s") are in weight percent (based on 100% active) of the total composition.

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

The term "protective composition", as used herein, is meant to mean and include a formulation used for the purpose of treating a surface or substrate to effectively leave a thin coating or layer of material or otherwise deposit on the surface one or more materials present in said composition that provide some aesthetic or protective benefit.

The term "cleaning composition", as used herein, is meant to mean and include a formulation having at least one surfactant or at least one solvent.

The term "surfactant", as used herein, is meant to mean and include a substance or compound that reduces surface tension when dissolved in water or water solutions, or that reduces interfacial tension between two liquids, or between a liquid and a solid. The term "surfactant" thus includes anionic, cationic, nonionic, zwitterionic and/or amphoteric agents.

The terms "viscosity", as used herein is the viscosity of a liquid component of the invention as quoted as a kinematic viscosity in centistokes (cSt), measured at 25° C. (77° F.), unless otherwise specified.

Composition

The inventive compositions comprise combinations of a silicone oil and a rheological polymer modifier that provides for aqueous dispersions exhibiting the desired rheological parameters of Critical Strain and Elastic Modulus values as described herein. The inventive compositions provide for aqueous dispersions of silicone oils without the requirement of conventional emulsifiers and/or emulsifying agents. Hence, by means of the present invention, stable dispersions of silicone oils in water may be formed without the use of emulsifiers, such as surfactants, hydrotropes, solvents and their mixtures. The inventive compositions exhibit desirable chemical and physical properties, including ease of formulation, stability, processability, handling, extended storage stability, resistance to prolonged heating, cooling and freezing, reduced foaming tendency and ease of dispensing. The inventive compositions also exhibit desirable aesthetic properties, including a typically more transparent or translucent appearance than the appearance of a typical silicone oil emulsion, which appears milky or white to the eye.

Silicone

The composition of the present invention requires at least one organopolysiloxane fluid. These fluids are also commonly referred to as "silicone oils" or "silicones" and are distinguished from silicone elastomers and resins, which are more thoroughly cross-linked than silicone oils. Suitable silicone fluids include those based on organopolysiloxanes, these being selected from the class of polymers having the general formula $(R_n SiO_{((4-n)/2)})$ m (I) wherein n is between 0 and 3 and m is 2 or greater, and R is alkyl or aryl, as defined in Silicone Compounds Register and Review, 5th Edition, R. Anderson, G. L. Larson and C. Smith Eds., Hüls America Inc., Piscataway, N.J., p 247 (1991), which is hereby incorporated by reference. The value of m may be as large as one million or more, but more commonly has a value of between about 5 and 1000, these being readily flowable liquids with good handling properties and performance characteristics. These example silicones can be linear or branched. Various naming conventions and nomenclature that are essentially equivalent to this exemplary class of silicones, include, but are not limited to: dialkylpolysiloxane hydrolyzate; alpha-alkyl-omega-methoxypolydialkylsiloxane; polydialkyl silicone oil; poly(dialkylsiloxane); alkyl end-blocked polydialkylsiloxane; polyoxy(dialkylsilylene), alpha-(trialkylsilyl)-omega-hydroxy; poly[oxy(dialkylsilylene)], alpha-[trialkylsilyl]-omega-[(trialkylsilyl)oxy]; and alpha-(trialkylsilyl)poly[oxy(dialkylsilylene)]-omega-alky. Some additional suitable examples also include dimethicone copolyol, dimethylpolysiloxane, diethylpolysiloxane, high molecular weight dimethicone, mixed C1-C30 alkyl polysiloxane, phenyl dimethicone, dimethiconol, and mixtures thereof. Nonlimiting examples of silicones useful herein are also described in U.S. Pat. No. 5,011,681, to Ciotti et al., which is hereby incorporated by reference. The silicone compounds useful herein also include polyalkyl or polyaryl siloxanes. The alkyl or aryl groups substituted on the siloxane chain (R) or at the ends of the siloxane chains can have any structure as long as the resulting silicone remains fluid at or around room temperature. Suitable R groups include hydroxy, methyl, methoxy, ethyl, ethoxy, propyl, propoxy, phenyl, methylphenyl, phenylphenyl, aryl and aryloxy. One or more R groups on the silicon atom may represent the same group or different groups, or any combination thereof. Suitable silicone compounds are polydimethylsiloxane, polydiethylsiloxane, and polymethylphenylsiloxane. Polydimethylsiloxane, which is also known as dimethicone, is suitable and readily available in many forms and grades, including for example, edible grades suitable for use in compositions for food contact usage. The polyalkylsiloxanes that can be used include, for example, polydimethylsiloxanes. These silicone compounds are available, for example, from the General Electric Company in their Viscasil® and SF 96 series, and from Dow Corning in their Dow Corning 200 series. Polyalkylaryl siloxane fluids containing one or more alkyl or alkylaryl substituents can also be used, for example, and include, but are not limited to polymethylphenylsiloxanes, poly[(dimethylsiloxane)/(methylvinylsiloxane)], poly[(dimethylsiloxane)/(diphenylsiloxane)], poly[(dimethylsiloxane)/(phenylmethylsiloxane)], and poly[(dimethylsiloxane)/(diphenylsiloxane)/(methylvinylsiloxane)]. These siloxanes are available, for example, from the General Electric Company as SF 1075 methyl phenyl fluid or from Dow Corning as 556 Cosmetic Grade Fluid, Rhodorsil 763 from Rhône-Poulenc, Silbione 70641 V 30 and 70641 V 200 from Rhône-Poulenc, the silicones of the PK series from Bayer, such as PK20, the silicones of the PN and PH series from Bayer, such as PN 1000 and PH 1000, and certain oils of the SF series from General Electric, such as SF 1250, SF 1265, SF 1154 and SF 1023. Higher molecular weight silicones, including silicone gums and resins, may be used in accordance with the present invention and include polydiorganosiloxanes with a molecular mass of between 200,000 and 5,000,000, used alone or as a mixture in a solvent chosen from volatile silicones, polydimethylsiloxane (PDMS) oils, polyphenylmethylsiloxane (PPMS) oils, isoparaffins, methylene chloride, pentane, dodecane, tridecane and tetradecane, or mixtures thereof. The silicones can be linear or branched, and can be modified by chemical groups to provide additional properties. For example, suitable silicones also include the amino modified silicones, wherein R is an amine, amide or alkyl, dialkyl or trialkyl derivatized amine constituent. By substitution of one or more of the R groups with other organic or functionalized organic groups, such as vinyl, phenyl, fluoroalkyl, perfluoroalkane, carboxylic acid derivatives, carboxyester and quaternary ammonium derivatives, other organopolysiloxanes can be produced. Included are mixtures of these materials, for example, but not limited to: 1) mixtures formed from a polydimethylsiloxane hydroxylated at the end of the chain (Dimethiconol according to the CTFA nomenclature) and from a cyclic polydimethylsiloxane (Cyclomethicone according to the CTFA nomenclature), such as the product Q2 1401 sold by the company Dow Corning; 2) mixtures formed from a polydimethylsiloxane gum with a cyclic silicone, such as the product SF 1214 Silicone Fluid from General Electric, which is an SE 30 gum of MW 500,000 dissolved in SF 1202 Silicone Fluid (decamethylcyclopentasiloxane); 3) mixtures of two PDMS materials of different viscosities, for example a PDMS gum and a PDMS oil, such as the products SF 1236 and CF 1241 from the company General Electric. The product "SF 1236" is a mixture of an SE 30 gum defined above, with a viscosity of 20 $m^2/s$, and of an SF 96 oil with a viscosity of $5 \times 10^{-5}$ $m^2/s$ (15% SE 30 gum and 85% SF 96 oil). The product "CF 1241" is a mixture of an SE 30 gum (33%) and of a PDMS (67%) with a viscosity of $10^{-3}$ $m^2/s$. The organo-modified silicones in accordance with the present invention are silicones as defined above, containing in their general structure one or more organofunctional groups directly attached to the siloxane chain or attached via a hydrocarbon-based radical. Examples include silicones containing: a) polyethyleneoxy and/or polypropyleneoxy groups, optionally containing alkyl groups, such as: the product known as dimethicone copolyol sold by the company Dow Corning under the name "DC 1248", and alkyl (C12) methicone copolyol sold by the company Dow Corning under the name "Q2 5200", the oils "Silwet" L 722, L 7500, L 77 and L 711 from the company General Electric, the mixture of dimethicone copolyol and of cyclomethicone, such as the product sold under the name "Q2-3225C" by the company Dow Corning; the product "Mirasil DMCO" sold by Rhône-Poulenc; b) (per)fluoro groups, for instance trifluoroalkyl groups, such as, for example, those sold by the company General Electric under the names "FF 150 Fluorosilicone Fluid" or by the company Shin Etsu under the names "X-22-819", "X-22-820", "X-22-821", "X-22-822" or "FL 100"; c) hydroxyacylamino groups, such as those described in European patent application EP-A-0,342,834, and in particular the silicone sold by the company Dow Corning under the name "Q2-8413"; d) thiol groups, such as in the silicones "X 2-8360" from Dow Corning or "GP 72A" and "GP 71" from Genesee; Union Carbide or the silicone known as "Amodimethicone" in the CTFA dictionary; f) carboxylate groups, such as the products described in European patent EP 186,507 from Chisso Corporation, which is hereby incorporated by reference; g) hydroxylated groups, such as the polyorganosiloxanes containing a hydroxyalkyl function, described in patent application FR-A-2,589,476, which is hereby incorporated by reference, and in particular polyorganosiloxanes containing a γ-hydroxy-propyl function; h) alkoxylated groups containing at least 12 carbon atoms, such as the product "Silicone Copolymer F 7551" from SWS Silicones and the products "Abilwax 2428", "Abilwax 2434" and "Abilwax 2440" from the company Goldschmidt; i) acyloxyalkyl groups containing at least 12 carbon atoms, such as, for example, the poly-organosiloxanes described in patent application FR-A-2,641,185, which is hereby incorporated by reference, and in particular polyorganosiloxanes containing a stearoyloxypropyl function; j) quaternary ammonium groups, such as in the products "X2 81 08" and "X2 81 09" and the product "Abil K 3270" from the company Goldschmidt; k) amphoteric or betaine groups, such as in the product sold by the company Goldschmidt under the name "Abil B 9950"; 1) bisulphite groups, such as in the products sold by the company Goldschmidt under the names "Abil S 201" and "Abil S 255". The block copolymers having a polysiloxane-polyoxyalkylene linear block as repeating unit, which are used in the context of the present invention, include those have the following general formula: $([Y(R_2SiO)aR'_2SiYO][C_nH_{2n}O)_b])_c$ (II) in which R and R', which may be identical or different, represent a monovalent hydrocarbon-based radical containing no aliphatic unsaturation, n is an integer ranging from 2 to 4, a is an integer greater than or equal to 5, particularly between 5 and 200 and even more particularly between 5 and 100, b is an integer greater than or equal to 4, particularly between 4 and 200 and even more particularly between 5 and 100, c is an integer greater than or equal to 4, particularly between 4 and 1000 and even more particularly between 5 and 300, Y represents a divalent organic group which is linked to the adjacent silicon atom via a carbon-silicon bond and to a polyoxyalkylene block via an oxygen atom, the average molecular weight of each siloxane block is between about 400 and about 10,000, that of each polyoxyalkylene block being between about 300 and about 10,000, the siloxane blocks represent from about 10% to about 95% of the weight of the block copolymer, the average molecular weight of the block copolymer being at least 3000 and particularly between 5000 and 1,000,000 and even more particularly between 10,000 and 200,000. R and R' are suitably chosen from the group comprising alkyl radicals such as, for example, the methyl, ethyl, propyl, butyl, pentyl, hexyl, octyl, decyl and dodecyl radicals, aryl radicals such as, for example, phenyl and naphthyl, arylalkyl radicals such as, for example, benzyl and phenethyl, and tolyl, xylyl and cyclohexyl radicals. Y is suitably selected from radicals including —R"—, —R"—CO—, —R"—NHCO—, —R"—NH—CO—NH—R"—NHCO or —R"—OCONH—R'"—NHCO—, where R" is a divalent alkylene group such as, for example, ethylene, propylene or butylene, and R'" is a divalent alkylene group or a divalent arylene group such as —$C_6H_4$—, —$C_6H_4C_6H_4$—, $C_6H_4$—$CH_2$—$C_6H_4$, $C_6H_4$—C($CH_3$)$_2C_6H_4$. Even more particularly, Y represents a divalent alkylene radical, more particularly the —$CH_2$—$CH_2$—$CH_2$— radical or the —$C_4H_8$— radical. The preparation of the block copolymers used in the context of the present invention is described in European application EP 0,492,657 A1, which is hereby incorporated by reference.

Also suitable are the use of one or more volatile silicones, that is silicone oils with sufficient vapor pressure or volatility sufficient to at least partially or completely evaporate into the atmosphere during and/or after application of the inventive compositions onto a surface. The inventive compositions may in one embodiment contain solely a volatile silicone fluid as the silicone oil, or in an alternative embodiment may optionally contain one or more volatile silicone fluids in combination, or in yet another embodiment may optionally contain one or more volatile and one or more non-volatile silicone fluids in combination. The more volatile silicones are believed to promote leveling of the residual silicone polish film, thus deepening the color of painted surfaces, and to aid in controlling the flowability and/or spreadability of the composition, particularly in embodiments of the invention employing less volatile or non-volatile silicone oils that are desired to be deposited onto the treated surface. Volatile silicone fluids generally are low viscosity silicone fluids with an appreciable vapor pressure at ambient temperatures. Generally, the volatile silicone fluids useful in the present invention have a viscosity of less than about 10 centistokes at 25° C., and optionally less than about 5 centistokes at 25° C.

Suitable volatile silicone fluids include the polydimethylcyclosiloxanes. Polydimethylcyclosiloxane fluids useful in the present invention can be defined by the general formula $[(CH_3)_2 SiO]_x$ where x has a value from three to eight. Generally, the polydimethylcyclosiloxane fluid useful in the present invention is a mixture of one or more of the various species represented by the above formula. The commercial polydimethylcyclosiloxanes are mixtures of the various species represented by the above formula and are considered within the scope of the present invention. Some suitable polydimethylcyclosiloxane fluids for use in this invention are those where octamethylcyclotetrasiloxane, decamethylcyclopentasiloxane, and dodecamethylcyclohexasiloxane (i.e. where x is from 4 to 6) predominate. The fluids where decamethylcyclopentasiloxane and dodecamethylcyclohexasiloxane predominate are particularly suited. In accordance with another embodiment, those volatile silicone fluids manufactured by Dow Corning™ Corporation are used. It is believed that Dow Corning 245 and 345 volatile silicone fluids primarily consist of decamethylcyclopentasiloxane with lesser amounts of dodecamethylcyclohexasiloxane and minor amounts of octamethylcyclotetrasiloxane. Other suitable volatile silicones include "DC 244", "DC 245", "DC 246", "DC 344", "DC 345", and "DC 346" (manufactured by Dow Corning); Silicone 7207 and Silicone 7158 (manufactured by the Union Carbide Corp.); SF 1202 (manufactured by General Electric); and SWS-03314 (manufactured by SWS Silicones, Inc.).

Also suitable for use, and particularly in combination with other silicone oils, are the class of silicone wetting and/or leveling agents which aid in the spreading and leveling of silicone oils onto treated surfaces. Some of the exemplary silicones described above may serve this purpose in addition to their coating properties. Additional examples also include, but are not limited to, polyalkyleneoxide modified polydimethylsiloxane, available from General Electric as Silwet 7650, polyalkyleneoxide modified heptamethyltrisiloxane, also available from General Electric as Silwet 7280 and Silwet 7608, silicone glycol copolymer surfactant, available from Dow Corning as DC 57 and the Dow Corning silicone polyether surfactant designated Q2-5211. Additional examples also include materials with additional leveling properties, such as for example, but not limited to alkyl methyl siloxanes DC 56 available from Dow Corning and organomodified dimethylsiloxane available from General Electric designated as Formasil 433.

Mixtures and combinations of any of the silicone oils exampled herein, for example, silicone oils having different molecular weights, different viscosities, different functionalized derivatives, different volatilities and/or vapor pressures, different properties and benefits, and combinations thereof, may advantageously be combined in the compositions of the present invention. For example, a "lighter" or lower viscosity polyorganosiloxane can be combined with a "heavier" or higher viscosity silicone oil, and/or a silicone gum and/or silicone elastomer for purposes of dispersion in the compositions of the present invention, wherein the "heavier" materials would otherwise be difficult to handle and disperse if used solely or in combinations without a "lighter" silicone included. Alternatively, a volatile silicone oil may be combined with a less volatile or essentially non-volatile silicone oil, depending on the end use application. Alternatively, a silicone oil having spreading, wetting or selective leveling properties may be combined with another silicone oil in order to enhance the spreading and leveling of the combined silicone oil mixture for beneficial effect on the surfaces treated with the inventive compositions described herein.

The use of silicone oils in the inventive compositions containing these and other substituted organopolysiloxanes, and their combinations and mixtures, is a matter of choice, depending upon the material to be treated and/or the environment to which the treated materials are to be subject, as well as depending upon the desired surface characteristics desired to be imparted to the surface. The silicones may be premixed in their desired proportions prior to processing, or mixed during actual processing of the inventive compositions, or combined into the inventive compositions in any suitable order or fashion, subject solely to considerations of ease of handling, transport, mixing and processing of the inventive compositions.

The organopolysiloxane in the composition is believed to provide a water and water vapor resistant coating upon the surface of the treated materials to enhance their resistant to environmental stresses, such as water permeation, oxygen permeation and assault by other environmental contaminants.

The organopolysiloxanes are also useful for imparting a shine or glossy coating to the treated surfaces, resulting in enhanced appearance and other aesthetic benefits associated with modification of incident light, such as refractive and diffusive contributions to specular reflections that contribute to the perception of enhanced color and tone, and decreased perception of surface defects such as scratches, stress cracks, striations, and other surface defects that commonly develop on surfaces with normal age and wear. Hence, the organopolysiloxanes are useful for their restorative effect when used on aged and worn surfaces, particularly elastomeric surfaces that suffer most from these conditions.

The organopolysiloxane in the composition are also believed to provide a soil, oil, dirt and grime resistant coating upon the surface of the treated materials, such as for example, household surfaces including, but not limited to stainless steel, tile, porcelain, marble and the like, to enhance their resistant to staining and soiling, water and microbial growth. In one embodiment of the present invention, the organopolysiloxane includes one or more of a silicone selected from polydimethylsiloxane, polydiethylsiloxane, polymethylphenylsiloxane, polyalkylarylsiloxane, polyethyleneoxydialkylsiloxane, polypropyleneoxydialkylsiloxane and polydialkylcyclosiloxane.

In suitable embodiments, the organopolysiloxane comprises 0.01% by weight to about 20% by weight, or 0.01% by weight to about 10% by weight, or alternatively 0.1% by weight to about 5% by weight of the inventive composition.

Rheological Modifier

The inventive compositions require the use of at least one polymer that provides rheological structure to the aqueous system in combination with the dispersed organopolysiloxane. Polymers suitable for use are selected from the group of polymers that provide aqueous dispersions of the silicone oil in aqueous compositions exhibiting the desired rheological parameters of Critical Strain value and Elastic Modulus as described herein. The primary function of the polymers is their utility in stabilizing fine dispersions, that is to say fine droplets, of the silicone oils in the aqueous phase, providing compositions with good handling, storage and dispensing characteristics that exhibit the characteristic rheological parameters described herein. Without being bound by theory, it is believed that polymers employed in the invention provide for extended polymer networks within the aqueous phase having properties, defined through the rheological parameters of Critical Strain and Elastic Modulus, that effectively stabilize a plurality of fine droplets of the hydrophobic phase through a physical mechanism without the requirement of emulsification, that is to say, without the requirement of surface active emulsifier compounds that are commonly employed in the art to modify the surface and/or interfacial properties of the hydrophobic phase for compatibility within the aqueous phase or water continuum.

Hence, polymers that are able to form extended networks in an aqueous environment are suitably employed in the inventive compositions and are selected from the class of polymers that exhibit the desired rheological parameters that have been discovered here to effectively represent a rheological domain, defined by the Critical Strain and Elastic Modulus as described herein, where the silicone oils can be formulated as fine dispersions without the use of conventional emulsifiers.

Also suitable are polymers that provide a dual benefit to the inventive compositions in that they provide for compositions exhibiting the desired rheological Critical Strain Value and Elastic Modulus Value parameters, and also providing an additional or secondary benefit. An exemplary secondary benefit is surface modification of the surfaces treated with the inventive compositions, whereby the surface is modified to exhibit a property such as enhanced hydrophilicity, hydrophobicity, anti-soiling, water and/or stain repellency, reduced friction, increased lubricity, softness, anti-static and/or charge dissipative properties, reduced dust and/or lint retention, and the combinations of these properties and/or benefits.

In suitable embodiments of the invention, polymeric material that improves the hydrophilicity of the surface being treated is incorporated into the present compositions. The increase in hydrophilicity provides improved final appearance by providing "sheeting" of the water from the surface and/or spreading of the water on the surface, and this effect is particularly seen when the surface is wiped following application of the inventive compositions, during which process the silicone component is preferentially deposited onto the treated surface and the excess water present in the composition is to be removed during the wiping process. A beneficial effect is also achieved when treated surfaces are rewetted and even when subsequently dried after the rewetting with a subsequent treatment with the inventive compositions. Polymer substantivity is beneficial as it prolongs the sheeting and cleaning benefits. Another desirable feature of suitable polymers is lack of visible residue upon drying.

In general, the inventive compositions may employ water-soluble or water dispersible polymers. The inventive compositions may employ nonionic (neutral and/or non-ionizable), anionic and/or cationic polymers, and their mixtures. Suitable anionic polymers include those with ionizable groups that are at least partially anionic in solution, that is carrying a negative charge in solution, or which can be at least partially or fully neutralized to be at least partially or fully anionic in solution. Suitable cationic polymers include polymers that are ionizable (i.e. capable of being protonated) and those with permanent cationic groups, that is carrying a permanent positive charge, in solution. The inventive compositions may employ hydrophilic polymers, hydrophobic polymers or polymers exhibiting both properties owing to the presence of hydrophilic and hydrophobic monomer moieties. Suitable hydrophilic polymers are those that are preferably attracted to surfaces and are absorbed thereto without covalent bonds. Examples of suitable polymers include the polymers and co-polymers of N,N-dialkyl acrylamide, acrylamide, and certain monomers containing substituted and/or unsubstituted quaternary ammonium groups and/or amphoteric groups that favor substantivity to surfaces, along with co-monomers that favor adsorption of water, such as, for example, acrylic acid and other acrylate salts, sulfonates, betaines, and ethylene oxides. Water soluble or water dispersible cationic polymers may be suitable for their charge dissipative effect, antistatic, surface lubricating and potential softening benefits.

With respect to the synthesis of a water soluble or water dispersible cationic copolymer, the level of the first monomer, which has a permanent cationic charge or that is capable of forming a cationic charge on protonation, is typically between 3 and 80 mol % or alternatively between 10 to 60 mol % of the copolymer. The level of second monomer, which is an acidic monomer that is capable of forming an anionic charge in the composition, when present is typically between 3 and 80 mol % or alternatively between 10 to 60 mol % of the copolymer. The level of the third monomer, which has an uncharged hydrophilic group, when present is typically between 3 and 80 mol % or alternatively between 10 to 60 mol % of the copolymer. When present, the level of uncharged hydrophobic monomer is less than about 50 mol % or alternatively less than 10 mol % of the copolymer. The molar ratio of the first monomer to the second monomer typically ranges from 19:1 to 1:10 or alternatively ranges from 9:1 to 1:6. The molar ratio of the first monomer to the third monomer is typically ranges from 4:1 to 1:4 or alternatively ranges from 2:1 to 1:2.

The average molecular weight of the copolymer typically ranges from about 5,000 to about 10,000,000, with the suitable molecular weight range depending on the polymer composition with the proviso that the molecular weight is selected so that the copolymer is water soluble or water dispersible to at least 0.01% by weight in distilled water at 25° C.

Examples of permanently cationic monomers include, but are not limited to, quaternary ammonium salts of substituted acrylamide, methacrylamide, acrylate and methacrylate, such as trimethylammoniumethylmethacrylate, trimethylammoniumpropylmethacrylamide, trimethylammoniumethylmethacrylate, trimethylammoniumpropylacrylamide, 2-vinyl N-alkyl quaternary pyridinium, 4-vinyl N-alkyl quaternary pyridinium, 4-vinylbenzyltrialkylammonium, 2-vinyl piperidinium, 4-vinyl piperidinium, 3-alkyl 1-vinyl imidazolium, diallyldimethylammonium, and the ionene class of internal cationic monomers as described by D. R. Berger in *Cationic Surfactants, Organic Chemistry*, edited by J. M. Richmond, Marcel Dekker, New York, 1990, ISBN 0-8247-8381-6, which is incorporated herein by reference. This class includes co-poly ethylene imine, co-poly ethoxylated ethylene imine and co-poly quaternized ethoxylated ethylene imine, co-poly [(dimethylimino)trimethylene (dimethylimino)hexamethylene disalt], co-poly [(diethylimino)trimethylene (dimethylimino)trimethylene disalt], co-poly [(dimethylimino) 2-hydroxypropyl salt], co-polyquarternium-2, co-polyquarternium-17, and co-polyquarternium-18, as described in the *International Cosmetic Ingredient Dictionary*, 5th Edition, edited by J. A. Wenninger and G. N. McEwen, which is incorporated herein by reference. Other cationic monomers include those containing cationic sulfonium salts such as co-poly-1-[3-methyl-4-(vinyl-benzyloxy)phenyl]tetrahydrothiophenium chloride. Especially suitable monomers are mono- and di-quaternary derivatives of methacrylamide. The counterion of the cationic co-monomer can be selected from, for example, chloride, bromide, iodide, hydroxide, phosphate, sulfate, hydrosulfate, ethyl sulfate, methyl sulfate, formate, and acetate.

Examples of monomers that are cationic on protonation include, but are not limited to, acrylamide, N,N-dimethylacrylamide, N,N di-isopropylacryalmide, N-vinylimidazole, N-vinylpyrrolidone, ethyleneimine, dimethylaminohydroxypropyl diethylenetriamine, dimethylaminoethylmethacrylate, dimethylaminopropylmethacrylamide, dimethylaminoethylacrylate, dimethylaminopropylacrylamide, 2-vinyl pyridine, 4-vinyl pyridine, 2-vinyl piperidine, 4-vinylpiperidine, vinyl amine, diallylamine, methyldiallylamine, vinyl oxazolidone; vinyl methyoxazolidone, and vinyl caprolactam.

Monomers that are cationic on protonation typically contain a positive charge over a portion of the pH range of 2-11. Such suitable monomers are also presented in *Water-Soluble Synthetic Polymers: Properties and Behavior*, Volume II, by P. Molyneux, CRC Press, Boca Raton, 1983, ISBN 0-8493-6136. Additional monomers can be found in the *International Cosmetic Ingredient Dictionary*, 5th Edition, edited by J. A. Wenninger and G. N. McEwen, The Cosmetic, Toiletry, and Fragrance Association, Washington D.C., 1993, ISBN 1-882621-06-9. A third source of such monomers can be found in *Encyclopedia of Polymers and Thickeners for Cosmetics*, by R. Y. Lochhead and W. R. Fron, Cosmetics & Toiletries, vol. 108, May 1993, pp 95-135. All three references are incorporated herein.

Examples of acidic monomers that are capable of forming an anionic charge in the composition include, but are not limited to, acrylic acid, methacrylic acid, ethacrylic acid, dimethylacrylic acid, maleic anhydride, succinic anhydride, vinylsulfonate, cyanoacrylic acid, methylenemalonic acid, vinylacetic acid, allylacetic acid, ethylidineacetic acid, propylidineacetic acid, crotonic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, citraconic acid, vinylbenzoic acid, N-vinylsuccinamidic acid, mesaconic acid, methacroylalanine, acryloylhydroxyglycine, sulfoethyl methacrylate, sulfopropyl acrylate, and sulfoethyl acrylate. Exemplary acid monomers also include styrenesulfonic acid, 2-methacryloyloxymethane-1-sulfonic acid, 3-methacryloyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid and vinyl phosphoric acid. Suitable monomers include acrylic acid, methacrylic acid and maleic acid. The copolymers useful in this invention may contain the above acidic monomers and the alkali metal, alkaline earth metal, and ammonium salts thereof.

Examples of monomers having an uncharged hydrophilic group include but are not limited to vinyl alcohol, vinyl acetate, vinyl methyl ether, vinyl ethyl ether, ethylene oxide and propylene oxide. Also suitable are hydrophilic esters of monomers, such as hydroxyalkyl acrylate esters, alcohol ethoxylate esters, alkylpolyglycoside esters, and polyethylene glycol esters of acrylic and methacrylic acid.

Finally, examples of uncharged hydrophobic monomers include, but are not limited to, $C_1$-$C_4$ alkyl esters of acrylic acid and of methacrylic acid.

Suitable copolymers are formed by copolymerizing the desired monomers. Conventional polymerization techniques can be employed. Illustrative techniques include, for example, solution, suspension, dispersion, or emulsion polymerization. An exemplary method of preparation is by precipitation or inverse suspension polymerization of the copolymer from a polymerization media in which the monomers are dispersed in a suitable solvent. The monomers employed in preparing the copolymer are preferably water soluble and sufficiently soluble in the polymerization media to form a homogeneous solution. They readily undergo polymerization to form polymers which are water-dispersible or water-soluble. The exemplary copolymers contain acrylamide, methacrylamide and substituted acrylamides and methacrylamides, acrylic and methacrylic acid and esters thereof. Suitable synthetic methods for these copolymers are described, for example, in Kirk-Othmer, *Encyclopedia of Chemical Technology*, Volume 1, Fourth Ed., John Wiley & Sons.

Other examples of polymers that provide sheeting and anti-spotting benefits are polymers that contain amine oxide hydrophilic groups. Polymers that contain other hydrophilic groups such a sulfonate, pyrrolidone, and/or carboxylate groups can also be used. Examples of desirable polysulfonate polymers include polyvinylsulfonate, and also include polystyrene sulfonate, such as those sold by Monomer-Polymer Dajac (1675 Bustleton Pike, Feasterville, Pa. 19053). A typical formula is as follows: [CH($C_6H_4SO_3Na$)—$CH_2$]$_n$—CH($C_6H_5$)—$CH_2$ wherein n is a number to give the appropriate molecular weight as disclosed below.

Typical molecular weights are from about 10,000 to about 1,000,000, or alternatively from about 200,000 to about 700,000. Exemplary polymers containing pyrrolidone functionalities include polyvinyl pyrrolidone, quaternized pyrrolidone derivatives (such as Gafquat 755N from International Specialty Products), and co-polymers containing pyrrolidone, such as polyvinylpyrrolidone/dimethylaminoethylmethacrylate (available from ISP) and polyvinyl pyrrolidone/acrylate (available from BASF). Other materials can also provide substantivity and hydrophilicity including cationic materials that also contain hydrophilic groups and polymers that contain multiple ether linkages. Cationic materials include cationic sugar and/or starch derivatives and the typical block copolymer detergent surfactants based on mixtures of polypropylene oxide and ethylene oxide are representative of the polyether materials. The polyether materials are less substantive, however.

Also suitable are polymers comprising water-soluble amine oxide moieties. It is believed that the partial positive charge of the amine oxide group can act to adhere the polymer to the surface of the surface substrate, thus allowing water to "sheet" more readily. To the extent that polymer anchoring promotes better "sheeting", then higher molecular materials are suitable. Increased molecular weight improves efficiency and effectiveness of the amine oxide-based polymer. Suitable polymers of this invention may have one or more monomeric units containing at least one N-oxide group. At least about 10%, suitably more than about 50%, more suitably greater than about 90% of said monomers forming said polymers contain an amine oxide group. These polymers can be described by the general formula: P(B) wherein each P is selected from homopolymerizable and copolymerizable moieties which attach to form the polymer backbone, suitably vinyl moieties, e.g. C(R)2—C(R)2, wherein each R is H, C1-C12, preferably C1-C4 alkyl(ene), C6-C12 aryl(ene) and/or B; B is a moiety selected from substituted and unsubstituted, linear and cyclic C1-C12 alkyl, C1-C12 alkylene, C1-C12 heterocyclic, aromatic C6-C12 groups and wherein at least one of said B moieties has at least one amine oxide group present; u is from a number that will provide at least about 10% monomers containing an amine oxide group to about 90%; and t is a number such that the average molecular weight of the polymer is from about 2,000 to about 500,000, alternatively from about 5,000 to about 250,000, and also alternatively from about 7,500 to about 200,000. Exemplary polymers also include poly(4-vinylpyridine N-oxide) polymers (PVNO), wherein the average molecular weight of the polymer is from about 2,000 to about 500,000, alternatively from about 5,000 to about 400,000, and also alternatively from about 7,500 to about 300,000. In general, higher molecular weight polymers are suitable. Often, higher molecular weight polymers allow for use of lower levels of the polymer, which can provide benefits in surface cleaner applications of the inventive compositions. The desirable molecular weight range of polymers useful in the present invention stands in contrast to that found in the art relating to polycarboxylate, polystyrene sulfonate, and polyether based additives, which prefer molecular weights in the range of 400,000 to 1,500,000. Lower molecular weights for the exemplary polyamine oxide polymers of the present invention are due to greater difficulty in manufacturing these polymers in higher molecular weight.

Some non-limiting examples of homopolymers and copolymers which can be used as water soluble polymers of the present invention are: adipic acid/dimethylaminohydroxypropyl diethylenetriamine copolymer; adipic acid/epoxypropyl diethylenetriamine copolymer; polyvinyl alcohol; methacryloyl ethyl betaine/methacrylates copolymer; ethyl acrylate/methyl methacrylate/methacrylic acid/acrylic acid copolymer; polyamine resins; and polyquaternary amine resins; poly(ethenylformamide); poly(vinylamine) hydrochloride; poly(vinyl alcohol-co-vinylamine); poly(vinyl alcohol-co-vinylamine); poly(vinyl alcohol-co-vinylamine hydrochloride); and poly(vinyl alcohol-co-vinylamine hydrochloride). Alternatively, said copolymer and/or homopolymers are selected from the group consisting of adipic acid/dimethylaminohydroxypropyl diethylenetriamine copolymer; poly(vinylpyrrolidone/dimethylaminoethyl methacrylate); polyvinyl alcohol; ethyl acrylate/methyl methacrylate/ethacrylic acid/acrylic acid copolymer; methacryloyl ethyl betaine/methacrylates copolymer; polyquaternary amine resins; poly(ethenylformamide); poly(vinylamine) hydrochloride; poly(vinyl alcohol-co-vinylamine); poly(vinyl alcohol-co-vinylamine); poly(vinyl alcohol-co-vinylamine hydrochloride); and poly(vinyl alcohol-co-vinylamine hydrochloride).

Polymers useful in the present invention can be selected from the group consisting of copolymers of hydrophilic monomers. The polymer can be linear random or block copolymers, and mixtures thereof. The term "hydrophilic" is used herein consistent with its standard meaning of having at least some affinity for water. As used herein in relation to monomer units and polymeric materials, including the copolymers, "hydrophilic" means substantially water soluble and/or substantially water dispersible. In this regard, "substantially water soluble" or "substantially water dispersible" shall refer to a material that is soluble and/or dispersible in distilled (or equivalent) water, at 25° C., at a concentration of about 0.0001% by weight or greater. The terms "soluble", "solubility", "dispersible", and the like, for purposes hereof, correspond to the maximum concentration of monomer or polymer, as applicable, that can dissolve or disperse in water and/or other solvents, or their mixtures, to form a homogeneous solution, as is well understood to those skilled in the art.

Nonlimiting examples of useful hydrophilic monomers are unsaturated organic mono- and polycarboxylic acids, such as acrylic acid, methacrylic acid, crotonic acid, maleic acid and its half esters, itaconic acid; unsaturated alcohols, such as vinyl alcohol, allyl alcohol; polar vinyl heterocyclics, such as, vinyl caprolactam, vinyl pyridine, vinyl imidazole; vinyl amine; vinyl sulfonate; unsaturated amides, such as acrylamides, e.g., N,N-dimethylacrylamide, N-t-butyl acrylamide; hydroxyethyl methacrylate; dimethylaminoethyl methacrylate; salts of acids and amines listed above; and the like; and mixtures thereof. Some exemplary hydrophilic monomers are acrylic acid, methacrylic acid, N,N-dimethyl acrylamide, N,N-dimethyl methacrylamide, N-t-butyl acrylamide, dimethylamino ethyl methacrylate, thereof, and mixtures thereof.

Polycarboxylate polymers are those formed by polymerization of monomers, at least some of which contain carboxylic functionality. Common monomers include acrylic acid, maleic acid, ethylene, vinyl pyrrolidone, methacrylic acid, methacryloylethylbetaine, etc. Exemplary polymers for substantivity are those having higher molecular weights. For example, polyacrylic acid having molecular weights below about 10,000 are not particularly substantive and therefore do not normally provide hydrophilicity for three rewettings of a treated surface with the inventive compositions, although with higher levels, molecular weights down to about 1000 can provide some results. In general, the polymers should have molecular weights of more than about 10,000, preferably more than about 20,000, more preferably more than about 300,000, and even more preferably more than about 400,000. It has also been found that higher molecular weight polymers, e.g., those having molecular weights of more than about 10,000,000, are extremely difficult to formulate and are less effective in providing anti-spotting benefits than lower molecular weight polymers. Accordingly, the molecular weight should normally be, especially for polyacrylates, from about 1,000 to about 10,000,000; alternatively from about 5,000 to about 5,000,000; alternatively from about 10,000 to about 2,500,000; and also suitably from about 20,000 to about 1,000,000.

Non-limiting examples of polymers for use in the present invention include the following: poly(vinyl pyrrolidone/acrylic acid) sold under the name "Acrylidone"® by ISP and poly(acrylic acid) sold under the name "Accumer"® by Rohm & Haas. Other suitable materials include sulfonated polystyrene polymers sold under the name Versaflex® sold by National Starch and Chemical Company, especially Versaflex 7000.

Suitable polymers may be selected from the group consisting of water soluble and water dispersible polyacrylate polymers and copolymers containing at least one acrylate monomer, water swellable and alkali swellable polyacrylate polymers and copolymers containing at least one acrylate monomer, non-linear polyacrylate polymers cross-linked with at least one polyalkenyl polyether monomer, film-forming and water swellable non-soluble polyacrylate polymers, hydrophobically modified cross-linked polyacrylate polymers and copolymers containing at least one hydrophobic monomer, water dispersible associative and non-associative polyacrylate polymers and copolymers containing at least one acrylate monomer, and mixtures thereof. In additional suitable polymers, copolymers or derivatives thereof are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xantham and carrageen. Exemplary polymers are also selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates. Also suitable are polymers are selected from polyvinyl alcohols, polyvinyl alcohol copolymers and hydroxypropyl methyl cellulose (HPMC)\, xantham gum and starch. The polymer may have any weight average molecular weight from about 1000 to 1,000,000, or even from 10,000 to 300,000 or even from 15,000 to 200,000 or even from 20,000 to 150,000.

Also useful are polymer blend compositions, for example blends comprising a hydrolytically degradable and water-soluble polymer blend such as polylactide and polyvinyl alcohol, achieved by the mixing of polylactide and polyvinyl alcohol, typically comprising 1-35% by weight polylactide and approximately from 65% to 99% by weight polyvinyl alcohol, if the material is to be water-dispersible, or water-soluble.

In suitable embodiments, the polymer comprises 0.0001% by weight to about 10% by weight, or 0.001% by weight to about 5% by weight, or alternatively 0.01% by weight to about 1% by weight of the inventive composition.

Other Materials

The inventive composition may contain one or more cleaning agents and/or cleaning aid adjuvants. Suitable cleaning agents and cleaning aid adjuvants, for example, include, but are not limited to surfactants, solvents, bleaches, chelators, sequestrants, builders, polymers, enzymes, oxidants, surface modification agents, soil repellants, alkalis, alkalinity and acidity agents, pH adjustors, pH buffers, wetting agents, spreading agents, leveling agents and mixtures thereof. Enzymes, when used, include but are not limited to amylases, proteases, pectinases, cellulases, lipases, peroxidases and hydrolases, and their mixtures. Bleaching agents, when used, include, but are not limited to, peracids, hypohalite sources, hydrogen peroxide, and/or sources of hydrogen peroxide, or active oxygen and/or active halogens and/or active halogen releasing agents.

These optional one or more cleaning agents and/or cleaning aid adjuvants may be employed in embodiments of the inventive composition to provide further cleaning and protective benefit or functionality to the inventive composition.

In suitable embodiments, the cleaning agent and/or cleaning aid adjuvant comprises 0.0001% by weight to about 10% by weight, or 0.001% by weight to about 5% by weight, or alternatively 0.01% by weight to about 1% by weight of the inventive composition.

Surfactants

The inventive composition may contain one or more surfactants selected from anionic, nonionic, cationic, ampholytic, amphoteric and zwitterionic surfactants and mixtures thereof. A typical listing of anionic, nonionic, ampholytic, and zwitterionic classes, and species of these surfactants, is given in U.S. Pat. No. 3,929,678 to Laughlin and Heuring, which is hereby incorporated by reference. A list of suitable cationic surfactants is given in U.S. Pat. No. 4,259,217 to Murphy, which is hereby incorporated by reference. Where present, ampholytic, amphoteric and zwitterionic surfactants are generally used in combination with one or more anionic and/or nonionic surfactants.

The composition may comprise an anionic surfactant. Essentially any anionic surfactants useful for detersive purposes can be comprised in the inventive composition. These can include salts (including, for example, sodium, potassium, ammonium, and substituted ammonium salts such as mono-, di- and tri-ethanolamine salts) of the anionic sulfate, sulfonate, carboxylate and sarcosinate surfactants. Anionic surfactants may comprise a sulfonate or a sulfate surfactant. Anionic surfactants may comprise an alkyl sulfate, a linear or branched alkyl benzene sulfonate, or an alkyldiphenyloxide disulfonate, as described herein.

Other anionic surfactants include the isethionates such as the acyl isethionates, N-acyl taurates, fatty acid amides of methyl tauride, alkyl succinates and sulfosuccinates, monoesters of sulfosuccinate (for instance, saturated and unsaturated C12-C18 monoesters) diesters of sulfosuccinate (for instance saturated and unsaturated C6-C14 diesters), N-acyl sarcosinates. Resin acids and hydrogenated resin acids are also suitable, such as rosin, hydrogenated rosin, and resin acids and hydrogenated resin acids present in or derived from tallow oil. Anionic sulfate surfactants suitable for use herein include the linear and branched primary and secondary alkyl sulfates, alkyl ethoxysulfates, fatty oleoyl glycerol sulfates, alkyl phenol ethylene oxide ether sulfates, the C5-C17acyl-N-(C1-C4 alkyl) and -N-(C1-C2 hydroxyalkyl) glucamine sulfates, and sulfates of alkylpolysaccharides such as the sulfates of alkylpolyglucoside (the nonionic non-sulfated compounds being described herein). Alkyl sulfate surfactants may be selected from the linear and branched primary C10-C18 alkyl sulfates, the C11-C15 branched chain alkyl sulfates, or the C12-C14 linear chain alkyl sulfates.

Alkyl ethoxysulfate surfactants may be selected from the group consisting of the C10-C18 alkyl sulfates which have been ethoxylated with from 0.5 to 20 moles of ethylene oxide per molecule. The alkyl ethoxysulfate surfactant may be a C11-C18, or a C11-C15 alkyl sulfate which has been ethoxylated with from 0.5 to 7, or from 1 to 5, moles of ethylene oxide per molecule. One aspect of the invention employs mixtures of the alkyl sulfate and/or sulfonate and alkyl ethoxysulfate surfactants. Such mixtures have been disclosed in PCT Patent Application No. WO 93/18124, which is hereby incorporated by reference.

Anionic sulfonate surfactants suitable for use herein include the salts of C5-C20 linear alkylbenzene sulfonates, alkyl ester sulfonates, C6-C22 primary or secondary alkane sulfonates, C6-C24 olefin sulfonates, sulfonated polycarboxylic acids, alkyl glycerol sulfonates, fatty acyl glycerol sulfonates, fatty oleoyl glycerol sulfonates, and any mixtures thereof. Suitable anionic carboxylate surfactants include the alkyl ethoxy carboxylates, the alkyl polyethoxy polycarboxylate surfactants and the soaps ('alkyl carboxyl's'), especially certain secondary soaps as described herein. Suitable alkyl ethoxy carboxylates include those with the formula $RO(CH_2CH_2O)_xCH_2COO^-M^+$ wherein R is a C6 to C18 alkyl group, x ranges from 0 to 10, and the ethoxylate distribution is such that, on a weight basis, the amount of material where x is 0 is less than 20% and M is a cation. Suitable alkyl polyethoxypolycarboxylate surfactants include those having the formula RO—($CHR^1$—$CHR^2$—0)—$R^3$ wherein R is a C6 to C18 alkyl group, x is from 1 to 25, $R^1$ and $R^2$ are selected from the group consisting of hydrogen, methyl acid radical, succinic acid radical, hydroxysuccinic acid radical, and mixtures thereof, and $R^3$ is selected from the group consisting of hydrogen, substituted or unsubstituted hydrocarbon having between 1 and 8 carbon atoms, and mixtures thereof.

Suitable soap surfactants include the secondary soap surfactants, which contain a carboxyl unit connected to a secondary carbon. Suitable secondary soap surfactants for use herein are water-soluble members selected from the group consisting of the water-soluble salts of 2-methyl-1-undecanoic acid, 2-ethyl-1-decanoic acid, 2-propyl-1- nonanoic acid, 2-butyl-1-octanoic acid and 2-pentyl-1-heptanoic acid. Certain soaps may also be included as suds suppressors.

Other suitable anionic surfactants are the alkali metal sarcosinates of formula R—CON($R^1$)CH—)COOM, wherein R is a C5-C17 linear or branched alkyl or alkenyl group, $R^1$ is a C1-C4 alkyl group and M is an alkali metal ion. Examples are the myristyl and oleoyl methyl sarcosinates in the form of their sodium salts.

Essentially any alkoxylated nonionic surfactants are suitable herein, for instance, ethoxylated and propoxylated nonionic surfactants. Alkoxylated surfactants can be selected from the classes of the nonionic condensates of alkyl phenols, nonionic ethoxylated alcohols, nonionic ethoxylated/propoxylated fatty alcohols, nonionic ethoxylate/propoxylate condensates with propylene glycol, and the nonionic ethoxylate condensation products with propylene oxide/ethylene diamine adducts.

The condensation products of aliphatic alcohols with from 1 to 25 moles of alkylene oxide, particularly ethylene oxide and/or propylene oxide, are suitable for use herein. The alkyl chain of the aliphatic alcohol can either be straight or branched, primary or secondary, and generally contains from 6 to 22 carbon atoms. Also suitable are the condensation products of alcohols having an alkyl group containing from 8 to 20 carbon atoms with from 2 to 10 moles of ethylene oxide per mole of alcohol.

Polyhydroxy fatty acid amides suitable for use herein are those having the structural formula $R^2CONR^1Z$ wherein: $R^1$ is H, C1-C4 hydrocarbyl, 2-hydroxyethyl, 2-hydroxypropyl, ethoxy, propoxy, or a mixture thereof, for instance, C1-C4 alkyl, or C1 or C2 alkyl; and $R^2$ is a C5-C31 hydrocarbyl, for instance, straight-chain C5-C19 alkyl or alkenyl, or straight-chain C9-C17 alkyl or alkenyl, or straight-chain C11-C17 alkyl or alkenyl, or mixture thereof-, and Z is a polyhydroxyhydrocarbyl having a linear hydrocarbyl chain with at least 3 hydroxyls directly connected to the chain, or an alkoxylated derivative (for example, ethoxylated or propoxylated) thereof. Z may be derived from a reducing sugar in a reductive amination reaction, for example, Z is a glycidyl.

Suitable fatty acid amide surfactants include those having the formula: $R^1CON(R^2)_2$ wherein $R^1$ is an alkyl group containing from 7 to 21, or from 9 to 17 carbon atoms and each $R^2$ is selected from the group consisting of hydrogen, C1-C4 alkyl, C1-C4 hydroxyalkyl, and —$(C_2H_4O)_x$H, where x is in the range of from 1 to 3.

Suitable alkylpolysaccharides for use herein are disclosed in U.S. Pat. No. 4,565,647 to Llenado, having a hydrophobic group containing from 6 to 30 carbon atoms and a polysaccharide, e.g., a polyglycoside, hydrophilic group containing from 1.3 to 10 saccharide units, said reference being herein incorporated by reference. Alkylpolyglycosides may have the formula: $R^2O(C_nH_{2n}O)_t(glycosyl)_x$ wherein $R^2$ is selected from the group consisting of alkyl, alkylphenyl, hydroxyalkyl, hydroxyalkylphenyl, and mixtures thereof in which the alkyl groups contain from 10 to 18 carbon atoms; n is 2 or 3; t is from 0 to 10, and x is from 1.3 to 8. The glycosyl may be derived from glucose.

Suitable amphoteric surfactants for use herein include the amine oxide surfactants and the alkyl amphocarboxylic acids. Suitable amine oxides include those compounds having the formula $R^3(OR^4)_xNO(R^5)_2$ wherein $R^3$ is selected from an alkyl, hydroxyalkyl, acylamidopropyl and alkylphenyl group, or mixtures thereof, containing from 8 to 26 carbon atoms; $R^4$ is an alkylene or hydroxyalkylene group containing from 2 to 3 carbon atoms, or mixtures thereof, x is from 0 to 5, preferably from 0 to 3; and each $R^5$ is an alkyl or hydroxyalkyl group containing from 1 to 3, or a polyethylene oxide group containing from 1 to 3 ethylene oxide groups. Suitable amine oxides are C10-C18 alkyl dimethylamine oxide, and C10-18 acylamido alkyl dimethylamine oxide. A suitable example of an alkyl amphodicarboxylic acid is Miranol™ C2M Conc. manufactured by Miranol, Inc., Dayton, N.J.

Zwitterionic surfactants can also be incorporated into the inventive compositions. These surfactants can be broadly described as derivatives of secondary and tertiary amines, derivatives of heterocyclic secondary and tertiary amines, or derivatives of quaternary ammonium, quaternary phosphonium or tertiary sulfonium compounds. Betaine and sultaine surfactants are exemplary zwitterionic surfactants for use herein.

Suitable betaines are those compounds having the formula $R(R^1)_2N^+R^2COO^-$ wherein R is a C6-C18 hydrocarbyl. group, each $R^1$ is typically C1-C3 alkyl, and $R^2$ is a C1-C5 hydrocarbyl group. Suitable betaines are C12-18 dimethylammonium hexanoate and the C10-18 acylamidopropane (or ethane) dimethyl (or diethyl) betaines. Complex betaine surfactants are also suitable for use herein.

Suitable cationic surfactants to be used herein include the quaternary ammonium surfactants. The quaternary ammonium surfactant may be a mono C6-C24, or a C6-C24 N-alkyl or alkenyl ammonium surfactant wherein the remaining N positions are substituted by methyl, hydroxyethyl or hydroxypropyl groups. Suitable are also the monoalkoxylated and bis-alkoxylated amine surfactants.

Another suitable group of cationic surfactants, which can be used in the inventive compositions, are cationic ester surfactants. The cationic ester surfactant is a compound having surfactant properties comprising at least one ester (i.e. —COO—) linkage and at least one cationically charged group. Suitable cationic ester surfactants, including choline ester surfactants, have for example been disclosed in U.S. Pat. Nos. 4,228,042, 4,239,660 and 4,260,529, all of which are hereby incorporated by reference. The ester linkage and cationically charged group may be separated from each other in the surfactant molecule by a spacer group consisting of a chain comprising at least three atoms (i.e. of three atoms chain length), or from three to eight atoms, or from three to five atoms, or three atoms. The atoms forming the spacer group chain are selected from the group consisting, of carbon, nitrogen and oxygen atoms and any mixtures thereof, with the proviso that any nitrogen or oxygen atom in said chain connects only with carbon atoms in the chain. Thus spacer groups having, for example, —O—O— (i.e. peroxide), —N—N—, and —N—O— linkages are excluded, whilst spacer groups having, for example —$CH_2$—O—, $CH_2$— and —$CH_2$—NH—$CH_2$— linkages are included. The spacer group chain may comprise only carbon atoms, or the chain may be hydrocarbyl chain.

The inventive composition may comprise cationic monoalkoxylated amine surfactants, for instance, of the general formula: $R^1R^2R^3N^+ApR^4X^-$ wherein $R^1$ is an alkyl or alkenyl moiety containing from about 6 to about 18 carbon atoms, or from 6 to about 16 carbon atoms, or from about 6 to about 14 carbon atoms; $R^2$ and $R^3$ are each independently alkyl groups containing from one to about three carbon atoms, for instance, methyl, for instance, both $R^2$ and $R^3$ are methyl groups; $R^4$ is selected from hydrogen, methyl and ethyl; $X^-$ is an anion such as chloride, bromide, methylsulfate, sulfate, or the like, to provide electrical neutrality; A is a alkoxy group, especially a ethoxy, propoxy or butoxy group; and p is from 0 to about 30, or from 2 to about 15, or from 2 to about 8. The ApR$^4$ group in the formula may have p=1 and is a hydroxyalkyl group, having no greater than 6 carbon atoms whereby the —OH group is separated from the quaternary ammonium nitrogen atom by no more than 3 carbon atoms. Suitable ApR$^4$ groups are —CH$_2$CH$_2$—OH, —CH$_2$CH$_2$CH$_2$—OH, —CH$_2$CH(CH$_3$)—OH and —CH(CH$_3$)CH$_2$—OH. Suitable R$^1$ groups are linear alkyl groups, for instance, linear R$^1$ groups having from 8 to 14 carbon atoms.

Suitable cationic mono-alkoxylated amine surfactants for use herein are of the formula R$^1$(CH$_3$)(CH$_3$)N$^+$(CH$_2$CH$_2$O)$_{2-5}$H X$^-$ wherein R$^1$ is C10-C18 hydrocarbyl and mixtures thereof, especially C10-C14 alkyl, or C10 and C12 alkyl, and X is any convenient anion to provide charge balance, for instance, chloride or bromide. As noted, compounds of the foregoing type include those wherein the ethoxy (CH$_2$CH$_2$O) units (EO) are replaced by butoxy, isopropoxy [CH(CH$_3$)CH$_2$O] and [CH$_2$CH(CH$_3$)O] units (i-Pr) or n-propoxy units (Pr), or mixtures of EO and/or Pr and/or i-Pr units.

The cationic bis-alkoxylated amine surfactant may have the general formula: R$^1$R$^2$N$^+$ApR$^3$A'qR$^4$X$^-$ wherein R$^1$ is an alkyl or alkenyl moiety containing from about 8 to about 18 carbon atoms, or from 10 to about 16 carbon atoms, or from about 10 to about 14 carbon atoms; R$^2$ is an alkyl group containing from one to three carbon atoms, for instance, methyl; R$^3$ and R$^4$ can vary independently and are selected from hydrogen, methyl and ethyl, X$^-$ is an anion such as chloride, bromide, methylsulfate, sulfate, or the like, sufficient to provide electrical neutrality. A and A' can vary independently and are each selected from C1-C4 alkoxy, for instance, ethoxy, (i.e., —CH$_2$CH$_2$O—), propoxy, butoxy and mixtures thereof, p is from 1 to about 30, or from 1 to about 4 and q is from 1 to about 30, or from 1 to about 4, or both p and q are 1.

Suitable cationic bis-alkoxylated amine surfactants for use herein are of the formula R$^1$CH$_3$N$^+$(CH$_2$CH$_2$OH)(CH$_2$CH$_2$OH)X$^-$, wherein R$^1$ is C10-C18 hydrocarbyl and mixtures thereof, or C10, C12, C14 alkyl and mixtures thereof, X$^-$ is any convenient anion to provide charge balance, for example, chloride. With reference to the general cationic bis-alkoxylated amine structure noted above, since in one example compound R$^1$ is derived from (coconut) C12-C14 alkyl fraction fatty acids, R$^2$ is methyl and ApR$^3$ and A'qR$^4$ are each monoethoxy.

Other cationic bis-alkoxylated amine surfactants useful herein include compounds of the formula: R$^1$R$^2$N$^+$—(CH$_2$CH$_2$O)$_p$H—(CH$_2$CH$_2$O)$_q$H X$^-$ wherein R$^1$ C10-18 hydrocarbyl, or C10-C14 alkyl, independently p is 1 to about 3 and q is 1 to about 3, R$^2$ is C1-C3 alkyl, for example, methyl, and X$^-$ is an anion, for example, chloride or bromide. Other compounds of the foregoing type include those wherein the ethoxy (CH$_2$CH$_2$O) units (EO) are replaced by butoxy (Bu) isopropoxy [CH(CH$_3$)CH$_2$O] and [CH$_2$CH(CH$_3$)O] units (i-Pr) or n-propoxy units (Pr), or mixtures of EO and/or Pr and/or i-Pr units.

The inventive compositions may include a fluorosurfactant selected from nonionic fluorosurfactants, cationic fluorosurfactants, and mixtures thereof which are soluble or dispersible in the aqueous compositions being taught herein, sometimes compositions which do not include further detersive surfactants, or further organic solvents, or both. Suitable nonionic fluorosurfactant compounds are found among the materials presently commercially marketed under the trade name Fluorad® (ex. 3M Corp.) Exemplary fluorosurfactants include those sold as Fluorad® FC-740, generally described to be fluorinated alkyl esters; Fluorad® FC-430, generally described to be fluorinated alkyl esters; Fluorad® FC-431, generally described to be fluorinated alkyl esters; and, Fluorad® FC-170-C, which is generally described as being fluorinated alkyl polyoxyethylene ethanols.

Suitable nonionic fluorosurfactant compounds include those which is believed to conform to the following formulation: $C_nF_{2n+1}SO_2N(C_2H_5)(CH_2CH_2O)_xCH_3$ wherein: n has a value of from 1-12, or from 4-12, or 8; x has a value of from 4-18, or from 4-10, or 7; which is described to be a nonionic fluorinated alkyl alkoxylate and which is sold as Fluorad® FC-171 (ex. 3M Corp., formerly Minnesota Mining and Manufacturing Co.).

Additionally suitable nonionic fluorosurfactant compounds are also found among the materials marketed under the trade name ZONYL® (DuPont Performance Chemicals). These include, for example, ZONYL® FSO and ZONYL® FSN. These compounds have the following formula: $RfCH_2CH_2O(CH_2CH_2O)_xH$ where Rf is $F(CF_2CF_2)_y$. For ZONYL® FSO, x is 0 to about 15 and y is 1 to about 7. For ZONYL® FSN, x is 0 to about 25 and y is 1 to about 9.

An example of a suitable cationic fluorosurfactant compound has the following structure: $C_nF_{2n+1}SO_2NHC_3H_6N^+(CH_3)_3I^{--}$ where n~8. This catonic fluorosurfactant is available under the trade name Fluorad® FC-135 from 3M. Another example of a suitable cationic fluorosurfactant is $F_3$—$(CF_2)_n$—$(CH_2)_m$SCH$_2$CHOH—CH$_2$—N$^+$R$_1$R$_2$R$_3$Cl$^-$ wherein: n is 5-9 and m is 2, and R$_1$, R$_2$ and R$_3$ are —CH$_3$. This catonic fluorosurfactant is available under the trade name ZONYL® FSD (available from DuPont, described as 2-hydroxy-3-((gamma-omega-perfluoro-C$_{6-20}$-alkyl)thio)-N,N,N-trimethyl-1-propyl ammonium chloride). Other cationic fluorosurfactants suitable for use in the present invention are also described in EP 866,115 to Leach and Niwata.

In suitable embodiments, the surfactant comprises 0.0001% by weight to about 10% by weight, or 0.001% by weight to about 5% by weight, or alternatively 0.01% by weight to about 1% by weight of the inventive composition.

Solvent

A solvent may optionally be included in the compositions of the present invention to assist in removing dirt, grease, and other unwanted impurities from the surface to be treated. The particular solvent employed in the inventive composition may be selected depending on the particular end use application, and particularly on the type of surface to be treated. In addition, the solvent may serve to help solubilize non-water soluble or poorly water soluble adjuvants, such as ultraviolet light (UV) absorbers, fragrances, perfumes and the like, for the purpose of preventing separation of these ingredients in the inventive compositions. Suitable solvents include those having a range of relative volatilities, or vapor pressures, including solvents with very low vapor pressures and those solvents with very high vapor pressures, depending on the particular application. Suitable solvents include both hydrophilic and hydrophobic compounds, generally comprising solvents that are water soluble, water-miscible as well as water insoluble and water-immiscible compounds Suitable organic solvents include, but are not limited to, $C_{1-6}$ alkanols, $C_{1-6}$ diols, $C_{1-10}$ alkyl ethers of alkylene glycols, $C_{3-24}$ alkylene glycol ethers, polyalkylene glycols, short chain carboxylic acids, short chain esters, isoparaffinic hydrocarbons, mineral spirits, alkylaromatics, terpenes, terpene derivatives, terpenoids, terpenoid derivatives, formaldehyde, and pyrrolidones. Alkanols include, but are not limited to, methanol, ethanol, n-propanol, isopropanol, butanol, pentanol, and hexanol, and isomers thereof. Diols include, but are not limited to, methylene, ethylene, propylene and butylene glycols. Alkylene glycol ethers include, but are not limited to, ethylene glycol monopropyl ether, ethylene glycol monobutyl ether, ethylene glycol monohexyl ether, diethylene glycol monopropyl ether, diethylene glycol monobutyl ether, diethylene glycol monohexyl ether, propylene glycol methyl ether, propylene glycol ethyl ether, propylene glycol n-propyl ether, propylene glycol monobutyl ether, propylene glycol t-butyl ether, di- or tri-polypropylene glycol methyl or ethyl or propyl or butyl ether, acetate and propionate esters of glycol ethers. Commercial examples of these solvents available from the Dow Chemical Company include, but are not limited to propylene glycol methyl ether acetate (available as Dowanol® PMA), dipropylene glycol methyl ether acetate (available as Dowanol® DPMA), propylene glycol n-butyl ether (available as Dowanol® PnB), dipropylene glycol n-butyl ether (available as Dowanol® TPnB), propylene glycol phenol ether (available as Dowanol® PPh), ethylene glycol monobutyl ether (available as Dowanol® EB), diethylene glycol monobutyl ether (available as Dowanol® DB), ethylene glycol monohexyl ether (available as Hexyl Cellosolve®), diethylene glycol monohexyl ether (available as Hexyl Carbitol®), hydroxypolyethers (available as Ecosoft Solvents®), ethylene glycol phenyl ether (available as Dowanol® Eph), ethylene glycol phenol ether (available as Dalpad a Coalescing Agent), ethylene glycol n-butyl ether acetate (available as Butyl Cellosolve Acetate®), diethylene glycol n-butyl ether acetate (available as Butyl Carbitol Acetate®), dipropylene glycol n-propyl ether (available as Dowanol® DPnP) and mixtures thereof. Short chain carboxylic acids include, but are not limited to, acetic acid, glycolic acid, lactic acid and propionic acid. Short chain esters include, but are not limited to, glycol acetate, and cyclic or linear volatile alkylsiloxanes. Water insoluble solvents such as isoparaffinic hydrocarbons, mineral spirits, alkylaromatics, terpenoids, terpenoid derivatives, terpenes, and terpenes derivatives can be mixed with a water soluble solvent when employed.

Examples of organic solvent having a vapor pressure less than 0.1 mm Hg (20° C.) include, but are not limited to, dipropylene glycol n-propyl ether, dipropylene glycol t-butyl ether, dipropylene glycol n-butyl ether, tripropylene glycol methyl ether, tripropylene glycol n-butyl ether, diethylene glycol propyl ether, diethylene glycol butyl ether, dipropylene glycol methyl ether acetate, diethylene glycol ethyl ether acetate, and diethylene glycol butyl ether acetate (all available from Dow Corning Company).

These solvents may be combined with the silicone oils and/or silicone oil mixtures in order to better couple the silicone oils and/or their mixtures with the polymers employed to produce the aqueous dispersions of the inventive compositions.

In suitable embodiments, the solvent comprises 0.0001% by weight to about 10% by weight, or 0.001% by weight to about 5% by weight, or alternatively 0.01% by weight to about 1% by weight of the inventive composition.

Additional Adjuncts

The inventive compositions optionally contain one or more of the following adjuncts: lubricants, wetting agents, leveling agents, spreading agents, odor control agents, perfumes, fragrances and fragrance release agents, brighteners, fluorescent whitening agents, ultraviolet (UV) absorbers, UV scatterers, infra-red (IR) absorbers, IR scatterers, free-radical quenchers, free-radical stabilizers, excited state quenchers (ESQ) and/or anti-oxidants, and their mixtures. Examples of UV effective agents suitable for use include, but are not limited to Tinuvin 123, Tinuvin 292, Tinuvin 384, Tinuvin 171 and Tinuvin 99, all available form the Ciba Chemical Company. Other adjuncts include, but are not limited to, acids, electrolytes, dyes and/or colorants and/or pigments, solubilizing materials, stabilizers, thickeners, defoamers, hydrotropes, cloud point modifiers, preservatives, and other polymers and their mixtures. The solubilizing materials, when used, include, but are not limited to, hydrotropes (e.g. water soluble salts of low molecular weight organic acids such as the sodium and/or potassium salts of toluene, cumene, and xylene sulfonic acid). Defoamers, when used, include, but are not limited to, silicones, aminosilicones, silicone blends, and/or silicone/hydrocarbon blends.

In suitable embodiments, the additional adjunct comprises 0.0001% by weight to about 20% by weight, or 0.001% by weight to about 10% by weight, or alternatively 0.01% by weight to about 5% by weight of the inventive composition.

Preservatives

Preservatives, when used, include, but are not limited to, mildewstat or bacteriostat, methyl, ethyl and propyl parabens, short chain organic acids (e.g. acetic, lactic and/or glycolic acids), bisguanidine compounds (e.g. Dantogard and/or Glydant) and/or short chain alcohols (e.g. ethanol and/or IPA). The mildewstat or bacteriostat includes, but is not limited to, mildewstats (including non-isothiazolinones compounds) including Proxel GXL and Vantocil IB, from Avecia Corporation, Kathon GC, a 5-chloro-2-methyl-4-isothiazolin-3-one, KATHON ICP, a 2-methyl-4-isothiazolin-3-one, and a blend thereof, and KATHON 886, a 5-chloro-2-methyl-4-isothiazolin-3-one, and Neolone M-10, all available from Rohm and Haas Company; BRONOPOL, a 2-bromo-2-nitropropane 1, 3 diol, from Boots Company Ltd., PROXEL CRL, a propyl-p-hydroxybenzoate, from ICI PLC; NIPASOL M, an o-phenyl-phenol, sodium salt, from Nipa Laboratories Ltd., DOWICIDE A, a 1,2-Benzoisothiazolin-3-one, Dowacil 75, and Bioban, all from Dow Chemical Co., and IRGASAN DP 200, a 2,4,4'-trichloro-2-hydroxydiphenylether, from Ciba-Geigy A.G, and Surcide P from Surety Laboratories.

In suitable embodiments, the preservative comprises 0.0001% by weight to about 1% by weight, or 0.001% by weight to about 0.5% by weight, or alternatively 0.01% by weight to about 0.5% by weight of the inventive composition.

Antimicrobial Agent

Antimicrobial agents include quaternary ammonium compounds and phenolics. Non-limiting examples of these quaternary compounds include benzalkonium chlorides and/or substituted benzalkonium chlorides, di($C_6$-$C_{14}$)alkyl di short chain ($C_{1-4}$ alkyl and/or hydroxyalkl) quaternary ammonium salts, N-(3-chloroallyl) hexaminium chlorides, benzethonium chloride, methylbenzethonium chloride, and cetylpyridinium chloride. Other quaternary compounds include the group consisting of dialkyldimethyl ammonium chlorides, alkyl dimethylbenzylammonium chlorides, dialkylmethylbenzylammonium chlorides, and mixtures thereof, wherein the alkyl radicals may be C1 to C24. Biguanide antimicrobial actives including, but not limited to polyhexamethylene biguanide hydrochloride, p-chlorophenyl biguanide; 4-chlorobenzhydryl biguanide, halogenated hexidine such as, but not limited to, chlorhexidine (1,1'-hexamethylene-bis-5-(4-chlorophenyl biguanide) and its salts are also in this class.

In suitable embodiments, the antimicrobial comprises 0.0001% by weight to about 10% by weight, or 0.001% by weight to about 5% by weight, or alternatively 0.01% by weight to about 2.5% by weight of the inventive composition.

Alkalizing Agent

The inventive composition may include an alkalizing agent, selected from the class of materials commonly known as pH adjusters, alkalis (bases), alkalinity agents, builders, buffers, and their combinations. The alkalizing agents generally serve to adjust and/or control the pH of the composition and may also serve to increase the effectiveness of the optional cleaning adjuncts. The alkalizing agent may be employed to neutralize or partially neutralize polymers employed in the present invention that have ionizable anionic functionalities. The alkalizing agent may be selected from known pH adjustors, bases, alkali materials, builders and buffers, including but not limited to those described herein. The builder and/or buffer can also function as a water softener and/or a sequestering agent in the inventive composition. A variety of builders and/or buffers can be used and they include, but are not limited to, phosphate-silicate compounds, zeolites, alkali metal, ammonium and substituted ammonium polyacetates, trialkali salts of nitrilotriacetic acid, carboxylates, polycarboxylates, carbonates, bicarbonates, polyphosphates, aminopolycarboxylates, polyhydroxysulfonates, crown ethers, cyclodextrins and starch derivatives.

Builders or buffers can also include polyacetates and polycarboxylates. The polyacetate and polycarboxylate compounds include, but are not limited to, sodium, potassium, lithium, ammonium, and substituted ammonium salts of ethylenediamine tetraacetic acid, ethylenediamine triacetic acid, ethylenediamine tetrapropionic acid, diethylenetriamine pentaacetic acid, nitrilotriacetic acid, oxydisuccinic acid, iminodisuccinic acid, mellitic acid, polyacrylic acid or polymethacrylic acid and copolymers, benzene polycarboxylic acids, gluconic acid, sulfamic acid, oxalic acid, phosphoric acid, phosphonic acid, organic phosphonic acids, acetic acid, and citric acid. These builders or buffers can also exist either partially or totally in the hydrogen ion form.

The builder agent can include sodium and/or potassium salts of EDTA and substituted ammonium salts. The substituted ammonium salts include, but are not limited to, ammonium salts of methylamine, dimethylamine, butylamine, butylenediamine, propylamine, triethylamine, trimethylamine, monoethanolamine, diethanolamine, triethanolamine, isopropanolamine, ethylenediamine tetraacetic acid and propanolamine.

Buffering and pH adjusting agents, when used, include, but are not limited to, organic acids, mineral acids, alkali metal and alkaline earth salts of silicate, metasilicate, polysilicate, borate, hydroxide, carbonate, carbamate, phosphate, polyphosphate, pyrophosphates, triphosphates, tetraphosphates, ammonia, hydroxide, monoethanolamine, monopropanolamine, diethanolamine, dipropanolamine, triethanolamine, and 2-amino-2-methylpropanol. Exemplary buffering agents for compositions of this invention are nitrogen-containing materials. Some examples are amino acids such as lysine or lower alcohol amines like mono-, di-, and tri-ethanolamine. Other exemplary nitrogen-containing buffering agents are tri(hydroxymethyl)amino methane (TRIS), 2-amino-2-ethyl-1,3-propanediol, 2-amino-2-methyl-propanol, 2-amino-2-methyl-1,3-propanol, disodium glutamate, N-methyl diethanolamide, 2-dimethylamino-2-methylpropanol (DMAMP), 1,3-bis(methylamine)-cyclohexane, 1,3-diamino-propanol N,N'-tetra-methyl-1,3-diamino-2-propanol, N,N-bis(2-hydroxyethyl)glycine (bicine) and N-tris(hydroxymethyl)methyl glycine (tricine), morpholine and morpholine derivatives. Other suitable buffers include ammonium carbamate, citric acid, acetic acid. Mixtures of any of the above are also acceptable. Useful inorganic buffers/alkalinity sources include ammonia, the alkali metal carbonates and alkali metal phosphates, e.g., sodium carbonate, sodium polyphosphate. Additional buffers are disclosed in WO 95/07971, which is incorporated herein by reference. Other suitable pH adjusting agents include sodium or potassium hydroxide. Alternatively, in an embodiment of the current invention, an alkalizing agent is selected that exhibits or combines one or more of the desired properties of the class of materials known in the art as pH adjusters, alkalis, base, alkalinity agents, builders and buffers. For example, in one embodiment of the invention, a builder that serves as an alkalizer or pH adjusting agent effective at controlling the composition pH as well as providing builder functionality to the inventive compositions during use is selected. In another embodiment of the invention, a buffer is employed that serves to at least partially neutralize a polymer during the preparation stage of the compositions, and further serves to control the pH of the inventive composition over long storage times.

In suitable embodiments, the alkalizer agent, which may be selected from any one or more of a pH adjuster, an alkali, a base, an alkalinity agent, a builder, a buffer or any combination thereof, comprises 0.0001% by weight to about 10% by weight, or 0.001% by weight to about 5% by weight, or alternatively 0.01% by weight to about 1% by weight of the inventive composition.

Thickeners

In suitable embodiments of the invention, polymeric material that further changes the rheological characteristics of the inventive compositions is incorporated, provided that such addition does not effectively change either the Critical Strain Value and/or the Elastic Modulus Value of the composition to values outside of the respective selected ranges of Critical Stain Value and/or Elastic Modulus Value as defined herein. For some combinations of compositions and substrates a polymeric thickener may be suitable. Polymeric thickeners, when used, include, but are not limited to, polyacrylic acid and copolymers, polysaccharide polymers, which include substituted cellulose materials like carboxymethylcellulose, ethyl cellulose, hydroxyethylcellulose, hydroxypropylcellulose, hydroxymethylcellulose, succinoglycan and naturally occurring polysaccharide polymers like pectin, xanthan gum, guar gum, locust bean gum, tragacanth gum or derivatives thereof, and naturally occurring proteins and peptides like peptin, peptone, and the like, as well as polysaccharide and peptide polymers, such as peptidoglycans and the like. Inorganic thickeners, such as clays, silicas, zeolites, finely divided metal oxides, finely divided inorganic minerals and nanoparticulate materials, and their mixtures, may also be suitably employed.

In suitable embodiments, the thickener comprises 0.01% by weight to about 10% by weight, or 0.01% by weight to about 5% by weight, or alternatively 0.1% by weight to about 1% by weight of the inventive composition.

Fragrance

As used herein the term "fragrance oil" relates to the mixture of perfume raw materials that are used to impart an overall pleasant odor profile to a composition. As used herein the term "perfume raw material" relates to any chemical compound which is odiferous when in an un-entrapped state, for example in the case of pro-perfumes, the perfume component is considered, for the purposes of this invention, to be a perfume raw material, and the pro-chemistry anchor is considered to be the entrapment material. In addition "perfume raw materials" are defined by materials with a ClogP value preferably greater than about 0.1, more preferably greater than about 0.5, even more preferably greater than about 1.0. As used herein the term "ClogP" means the logarithm to base 10 of the octanol/water partition coefficient. This can be readily calculated from a program called "CLOGP" which is available from Daylight Chemical Information Systems Inc., Irvine Calif., U.S.A. Octanol/water partition coefficients are described in more detail in U.S. Pat. No. 5,578,563, which is hereby incorporated by reference.

The individual perfume raw materials which comprise a known natural oil can be found by reference to Journals commonly used by those skilled in the art such as "Perfume and Flavourist" or "Journal of Essential Oil Research". In addition some perfume raw materials are supplied by the fragrance houses as mixtures in the form of proprietary specialty accords. In order that fragrance oils can be developed with the appropriate character for the present invention the perfume raw materials have been classified based upon two key physical characteristics:

(i) boiling point (BP) measured at 1 atmosphere pressure. The boiling point of many fragrance materials are given in Perfume and Flavor Chemicals (Aroma Chemicals), Steffen Arctander (1969). Perfume raw materials for use in the present invention are divided into volatile raw materials (which have a boiling point of less than, or equal to, about 250° C.) and residual raw materials (which have a boiling point of greater than about 250° C., preferably greater than about 275° C.). All perfume raw materials will preferably have boiling points (BP) of about 500° C. or lower.

(ii) odor detection threshold which is defined as the lowest vapor concentration of that material which can be olfactorily detected. The odor detection threshold and some odor detection threshold values are discussed in e.g., "Standardized Human Olfactory Thresholds", M. Devos et al, IRL Press at Oxford University Press, 1990, and "Compilation of Odor and Taste Threshold Values Data", F. A. Fazzalar, editor ASTM Data Series DS 48A, American Society for Testing and Materials, 1978, both of said publications being incorporated by reference. Perfume raw materials for use in the present invention can be classified as those with a low odor detection threshold of less than 50 parts per billion, preferably less than 10 parts per billion and those with a high odor detection threshold which are detectable at greater than 50 parts per billion (values as determined from the references above).

Since, in general, perfume raw materials refer to a single individual compound, their physical properties (such as ClogP, boiling point, odor detection threshold) can be found by referencing the citations above. In the case that the perfume raw material is a natural oil, which comprises a mixture of several compounds, the physical properties of the complete oil should be taken as the weighted average of the individual components. In the case that the perfume raw material is a proprietary specialty accord the physical properties should be obtain from the Supplier.

In general a broad range of suitable perfume raw materials can be found in U.S. Pat. Nos. 4,145,184, 4,209,417, 4,515,705, and 4,152,272, all of which are hereby incorporated by reference. Non-limiting examples of perfume raw materials which are useful for blending to formulate fragrance oils for the present invention are given below. Any perfume raw materials, natural oils or proprietary specialty accords known to a person skilled in the art can be used within the present invention.

Volatile perfume raw materials useful in the present invention are selected from, but are not limited to, aldehydes with a relative molecular mass of less than or equal to about 200, esters with a relative molecular mass of less than or equal to about 225, terpenes with a relative molecular mass of less than or equal to about 200, alcohols with a relative molecular mass of less than or equal to about 200 ketones with a relative molecular mass of less than or equal to about 200, nitriles, pyrazines, and mixtures thereof.

Examples of volatile perfume raw materials having a boiling point of less than, or equal to, 250° C., with a low odor detection are selected from, but are not limited to, anethol, methyl heptane carbonate, ethyl aceto acetate, para cymene, nerol, decyl aldehyde, para cresol, methyl phenyl carbinyl acetate, ionone alpha, ionone beta, undecylenic aldehyde, undecyl aldehyde, 2,6-nonadienal, nonyl aldehyde, octyl aldehyde. Further examples of volatile perfume raw materials having a boiling point of less than, or equal to, 250° C., which are generally known to have a low odor detection threshold include, but are not limited to, phenyl acetaldehyde, anisic aldehyde, benzyl acetone, ethyl-2-methyl butyrate, damascenone, damascone alpha, damascone beta, floracetate, frutene, fructone, herbavert, iso cyclo citral, methyl isobutenyl tetrahydro pyran, iso propyl quinoline, 2,6-nonadien-1-ol, 2-methoxy-3-(2-methylpropyl)-pyrazine, methyl octine carbonate, tridecene-2-nitrile, allyl amyl glycolate, cyclogalbanate, cyclal C, melonal, gamma nonalactone, cis 1,3-oxathiane-2-methyl-4-propyl.

Other volatile perfume raw materials having a boiling point of less than, or equal to, 250° C., which are useful in the present invention, which have a high odor detection threshold, are selected from, but are not limited to, benzaldehyde, benzyl acetate, camphor, carvone, borneol, bornyl acetate, decyl alcohol, eucalyptol, linalool, hexyl acetate, iso-amyl acetate, thymol, carvacrol, limonene, menthol, iso-amyl alcohol, phenyl ethyl alcohol, alpha pinene, alpha terpineol, citronellol, alpha thujone, benzyl alcohol, beta gamma hexenol, dimethyl benzyl carbinol, phenyl ethyl dimethyl carbinol, adoxal, allyl cyclohexane propionate, beta pinene, citral, citronellyl acetate, citronellal nitrile, dihydro myrcenol, geraniol, geranyl acetate, geranyl nitrile, hydroquinone dimethyl ether, hydroxycitronellal, linalyl acetate, phenyl acetaldehyde dimethyl acetal, phenyl propyl alcohol, prenyl acetate, triplal, tetrahydrolinalool, verdox, cis-3-hexenyl acetate.

Examples of residual "middle and base note" perfume raw materials having a boiling point of greater than 250° C., which have a low odor detection threshold are selected from, but are not limited to, ethyl methyl phenyl glycidate, ethyl vanillin, heliotropin, indol, methyl anthranilate, vanillin, amyl salicylate, coumarin. Further examples of residual perfume raw materials having a boiling point of greater than 250° C. which are generally known to have a low odor detection threshold include, but are not limited to, ambrox, bacdanol, benzyl salicylate, butyl anthranilate, cetalox, ebanol, cis-3-hexenyl salicylate, lilial, gamma undecalactone, gamma dodecalactone, gamma decalactone, calone, cymal, dihydro iso jasmonate, iso eugenol, lyral, methyl beta naphthyl ketone, beta naphthol methyl ether, para hydroxylphenyl butanone, 8-cyclohexadecen-1-one, oxocyclohexadecen-2-one/habanolide, florhydral, intreleven aldehyde.

Other residual "middle and base note" perfume raw materials having a boiling point of greater than 250° C. which are useful in the present invention, but which have a high odor detection threshold, are selected from, but are not limited to, eugenol, amyl cinnamic aldehyde, hexyl cinnamic aldehyde, hexyl salicylate, methyl dihydro jasmonate, sandalore, veloutone, undecavertol, exaltolide/cyclopentadecanolide, zingerone, methyl cedrylone, sandela, dimethyl benzyl carbinyl butyrate, dimethyl benzyl carbinyl isobutyrate, triethyl citrate, cashmeran, phenoxy ethyl isobutyrate, iso eugenol acetate, helional, iso E super, ionone gamma methyl, pentalide, galaxolide, phenoxy ethyl propionate.

In suitable embodiments, the fragrance and/or perfume comprises 0.0001% by weight to about 10% by weight, or 0.001% by weight to about 5% by weight, or alternatively 0.01% by weight to about 1% by weight of the inventive composition.

Propellant

It may be desirable to employ the present invention in the form of an aerosol, particularly in a pressurized aerosol container employing a compressed gas or fluid to serve as a propellant system. Suitable propellants included compressible gases, including but not limited to air, nitrogen, argon, helium, carbon dioxide, nitrous oxide, and mixtures thereof. Suitable propellants include those standard aerosols known in the art as "LPG" or "liquid petroleum gas" propellants. Examples include, but are not limited to those commonly designated as LPG A-46, LPG A-70, LPG A-108 and their mixtures and combinations with other aerosols. LPG consists of high purity hydrocarbons derived directly from oil wells, and as a by-product from the petroleum industry, consisting essentially of a mixture of propane, isobutane and n-butane. Other common volatile organic compounds, and their derivatives may suitably be employed, including dialkyl ethers, such as dimethyl ether and diethyl ether and the petroleum ethers. Volatile organic compounds may also be suitably employed as propellants, include the alkane series from methane, propane, butane, pentane and hexane and all of their respective isomers, and mixtures thereof, alone and in combinations thereof. Propellants offering improved safety in terms of reduced or non-flammability are also suitable, and include such liquid propellants as those based on chlorofluorocarbons, even though it is realized that the chlorofluorocarbons are no longer generally used due to environmental considerations. Suitable alternatives, believed to be less harmful to the earth's environment and ozone layer, include non-halogenated and partially halogenated materials, such as hydrofluorocarbons (HFC), hydrofluoroalkanes (HFA) and hydrochloroalkanes (HCA) and hydrochlorofluorocarbons (HCFC). Some examples includes, but are not limited to HFC-125, HFC-134a, HFC-152a, HFC-227ea, HFC-245fa and HCFC-22. Also suitable are aerosol propellants approved by SNAP, under the United States Environmental Protection Agency (US-EPA) Significant New Alternatives Policy (detailed in Section 612 of the Clean Air Act), which includes oxygenated organic solvents (esters, ethers, alcohols) chlorinated solvents (trichloroethylene, perchloroethylene, methylene chloride), trans-1,2-dichloroethylene, hydrofluoroether (HFE) 7100 and HFE 7200, monochlorotoluenes and benzotrifluorides, (subject to a 50 ppm workplace standard for monochlorotoluenes and a 100 ppm standard for benzotrifluoride), HFC-4310mee (subject to a 200 ppm time-weighted average workplace exposure standard and 400 ppm workplace exposure ceiling HFC-365mfc), HCFC-225ca/cb, perfluorocarbons (PFCs) and perfluoropolyethers (PFPEs) (subject to need with no reasonable alternatives found sufficient for intended end use applications), HCFC-141b, terpenes, C5-C20 petroleum hydrocarbons, and HFC-245fa.

When an aerosol formulation is employed, one or more corrosion inhibitors known in the art are included in the formulations to protect metal portions of the pressurized system, including the can, valve, valve spring, nozzle and components of the aerosol package and dispenser assembly.

In suitable embodiments, the propellant comprises 1% by weight to about 90% by weight, or 2% by weight to about 80% by weight, or alternatively 5% by weight to about 70% by weight of the inventive composition.

Water

Since the composition is an aqueous composition, water can be, along with a solvent, a predominant ingredient. The water may be deionized, industrial soft water, or any suitable grade of water.

The water should be present at a level of less than 99.9% by weight, more preferably less than about 99% by weight, and most preferably, less than about 98% by weight. Where the inventive composition is concentrated, the water may be present in the composition at a concentration of less than about 85% by weight.

Processing

Compositions of the present invention are formed without the need of any solubilizing aid, dispersing aid, solvent, surfactant, or emulsifier or dispersant other than a polymer, as described herein, able to form a aqueous dispersion of the silicone oil in water which exhibits a rheological Critical Strain value greater than zero and less than about 0.5. Processing the compositions of the present invention can be achieved using conventional low shear and/or high shear mixing techniques know in the art. Processing of the inventive compositions generally does not require the use of high energy mixing techniques, such as high shear mixing, emulsification, sonication, ultrasonication, heated processing or use of stator/rotor mixers. High shear mixing processes can be employed if desired, but are not required owing to the unique rheological properties of the inventive compositions in order to achieve stable dispersions. The higher shear mixing processes may be employed for purposes of shortening the process time, however, since the additional mixing energy and heat introduced by these energetic processes typically result in faster processing rates, particularly with larger volumes of materials. However, the high shear mixing processes generally require additional energy and more complicated machinery and equipment, both more costly to use and maintain in an industrial or manufacturing environment. In some instances, high shear mixing may have detrimental effects on polymers and other susceptible components of the compositions, particularly optional adjuncts added to provide additional benefits or functionalities to the finished compositions, and may not be desirable as the sole mixing process. Hence, high shear processes can be used.

Alternatively, lower energy and low shear mixing techniques, such as agitation, paddle, blade, vortex and helical screw mixing are generally found sufficient for processing compositions of the present invention in order to achieve stable dispersions. The low shear mixing techniques lend themselves to both batch and dynamic mixing, or continuous and static mixing approaches for commercial scale preparation of the inventive compositions. Generally, an agitator is employed for low shear mixing in batch modes, that is processing of compositions in a single tank, typically in larger volume tanks exceeding several hundreds or thousands of gallons in fluid capacity. For low shear mixing in continuous modes, low shear static mixing, employing inline helical and vortex mixer elements, which produce laminar and turbulent mixing streams, respectively, are generally employed. In continuous mixing modes, the various raw materials are introduced to a continuous fluid stream of the most predominant raw material, typically the water component. The introduction is generally performed using multiple inlets each dispensing a proportioned amount of material at a rate of introduction adjusted to approximate the desired volume percentage or gravimetric weight percentage of each material in the final composition. The introduction can be via multiple inlets directly into the continuous fluid stream, or via one or more inlets following premix or batch premixing of any two or more compatible components. Thus, suitably compatible components may optionally be combined in smaller premixes or batches prior to introduction into the continuous mixer for ease of handling and processing. The introduction can be simultaneous, that is to say all proportioned materials introduced in the same zone of the continuous mixer, preferably before the shear mixer stage of the continuous mixer, or introduced in separate or multiple zones of the continuous mixer, with or without separate or multiple mixing zones between the inlets. Thus, the inventive compositions may be formed using a continuous process configured in any number of equally suitable configurations of component inlet, mixing and flow stages. Generally, the specific configuration is selected to best match available equipment and the desired properties of the final composition in order to achieve the most efficient continuous process.

Batch mode processing can also be suitably employed to prepare the silicone dispersions of the current invention. Batch mode processing has some advantages, particularly in that some polymers used in the current invention may require a pre-hydration step, sometimes known in the art as "wetting" or "wetting out", prior to further mixing steps, and can generally be performed in the same bulk tank that the remainder of the batch process, i.e. introduction and subsequent mixing of the remaining components of the composition, is conducted in. However, the pre-hydration step may be done in advance of a continuous mixing process, such that the feed stream of the polymer to the continuous mixer system is that of the "wetted" out polymer in aqueous solution.

Typically, the order of processing of the compositions of the present invention, for example in a batch mode process, begins with introduction of water into a batch tank sufficient to cover the mixer blades to a depth so that slow agitation may be begun without splashing, cavitation or introduction of air into the stirred liquid. A biocide or preservative is sometimes introduced next in the process to control microorganisms, but this is optional, and may or may not be required depending on the quality of the water and ingredients employed, or can be added at any later step in the process, or after the dispersion process is complete. The polymer, either in a powdered, preconcentrated or liquid solution or dispersion form is generally added next to the stirred batch water. The speed of introduction will depend somewhat on the form of the polymer used (i.e. powder or liquid) and its handling properties and equipment available to the operator. Generally, the speed of introduction is maximized for commercial processes for efficiency, although the formation of concentrated regions, clumps or insufficiently wetted powder during the introduction is undesirable, and the speed of introduction is typically adjusted to avoid these undesirable conditions. Once the entire charge of the polymer has been introduced, further mixing is continued for a short time, generally 10 to 60 minutes to fully hydrate or "wet out" the polymer material. Adjustments to the batch pH and/or acidity or alkalinity level are generally done following this step in the mixing process, in order to at least partially neutralize ionizable anionic polymers, or those anionic polymers known to be alkali swellable, or optionally pH adjustments may be made later in the process, or pH adjusted at any subsequent desired step, or partially adjusted at any subsequent step until the final desired pH of the finished composition, that is the composition with all essential materials and any optional materials added, is achieved. Generally an acid or alkalizing agent is employed, being any suitable material with the capability to either lower or raise the pH of the polymer solution from its native or unadjusted solution pH (typically depending on the polymer and the form in which it is supplied), to the desired solution pH. When polymers with ionizable anionic functionalities (anionic polymers) according to the present invention are employed, it is typically desired to use them in their partially or completely neutralized form, generally achieved by adjusting the anionic polymer solution to a pH of greater than about pH 5, at which they are at least partially neutralized. Optionally, neutralization can performed to only partially or completely neutralize the ionization anionic functionalities of the selected polymer. Optionally, the polymers can be further neutralized, that is converting a greater proportion of their ionizable anionic functionalities to the free base form (ionized form) by raising the pH to any desired pH above about pH 5 to about pH 13. Depending on the ionizable functionality of the polymer, substantially complete neutralization (ionization) is effectively achieved by raising the polymer solution pH to a value of about 2 to about 3 pH units above the average equilibrium acid dissociation constant (Ka) expressed as the negative logarithm of Ka, or pKa, of the polymer. Generally, interactions between the multiple ionizable functionalities and the solvent (water) result in the an average or bulk pKa value attributed to the polymer that differs somewhat from the pKa value of the pKa value of an individual monomeric ionizable functionality. Thus, the bulk or average pKa of the polymer is then generally considered, and this property can be measured by standard titration means well known in the art. Depending on the solution properties of the inventive compositions desired, the pH of the polymer solution of ionizable anionic polymers may be adjusted to any desired pH between about pH 5 to about pH 13.

For nonionic (neutral and/or non-ionizable) and/or cationic polymers, adjustments to the batch pH and/or acidity or alkalinity level are optionally, and such optional pH adjustment can be done at the step following polymer addition to water, or at a subsequent step in the process. Any desired solution pH may be employed in the inventive compositions employing neutral and cationic polymers, generally including the range of about pH 1 to about pH 13. In practice, the pH may optionally be adjusted at any step prior to introduction of any sensitive ingredients to the composition that would otherwise be chemically or physically compromised if the pH of the batch in progress was not adjusted. Optionally, in some embodiments of the invention employing neutral or cationic polymers, the pH of the polymer solution is not adjusted.

Following the "wetting out" step and/or neutralization step in the process in which either a neutral, anionic or cationic polymer solution is prepared, the organopolysiloxane, or silicone oil component is added next, although it may also be added at a later step, for example after the addition of other additives or adjuncts. The speed of introduction of the silicone oil component is generally less subject to problems, but the dispersion process takes some time to fully develop so too fast an addition will generally result in a separating phase, depending on the relative densities of the silicone oil to that of the batch polymer solution, either forming on the top or bottom of the batch tank and reducing the dispersion efficiency. Thus, in general, introduction of the silicone component is adjusted so that the introduction speed is approximately equivalent to the speed of formation of the dispersion to prevent excessive separation in the mixing tank. As the silicone oil component is generally more hydrophobic than the aqueous phase, less water soluble or water insoluble components of the composition, such optional adjuncts as described herein, may optionally be premixed with the silicone oil component prior to the dispersion process step. This approach generally provides for more uniform and stable inclusions of the less water soluble or water insoluble components desired to be present, rather than introducing them separately and/or at a later step in the process following the silicone oil dispersion process step, although these may also alternatively be added at an earlier step or a later step following the silicone oil addition. The silicone oil addition step may also alternatively be conducted in a continuous process operation as described herein. Following the silicone oil addition step, whether conducted in a batch or continuous process, a stable dispersion is created that will retain the silicone oil without significant separation suitable for immediate use and/or use following extended storage times. In general, the mixing process employed, including but not limited to those described herein for producing the silicone oil dispersions of the present invention, is sufficient to provide silicone oil dispersions wherein the dispersed silicone oil phase has an average particle size distribution around and/or below 500 microns. Silicone dispersions of the present invention having average particle size distributions around and/or below about 500 microns are found to have suitable stability and performance attributes during storage and use. Particle size can be measured during the mixing process to ensure that the particle size of the dispersed silicone oil phase is within the desired range, or measured after processing. Additional mixing, extended mixing time, and/or mixing with increased shearing or increased temperature may suitably be employed to further reduce the average particle size distribution of the inventive compositions to around and/or below about 500 microns. Further reduction of the particle size can optionally be performed by mixing techniques as described herein at any subsequent stage of the process, such as for example, after other additives and adjuncts have been added, or for example, during their addition. Alternatively, selected mixing techniques, such as for example, low shear and low energy mixing processes, can be employed at any subsequent stage of the process to introduce other additives and adjuncts to the compositions of the present invention without substantially changing the effective average particle size distribution of the dispersed silicone oil phase. Thus, a variety of mixing and processing techniques may be employed to achieve the desired average particle size distribution of the dispersed silicone oil phase in the inventive compositions, and these mixing and processing techniques may be employed in any order following the first preparation of the dispersions.

Once the silicone oil dispersions are formed, subsequent processing may optionally be employed, including introduction of other optional adjuncts, such as for example, but not limited to, introduction of solvents, surfactants, surface wetting agents, spreading agents, stabilizers, ultraviolet absorbers, ultraviolet light scatterers, ultraviolet blockers, pigments, dyes, coloring agents, preservatives, microbiocides, fungicides, plasticizers, alkalinity agents, buffers, pH adjusting acids, bases and their conjugate salts, fragrances, polishes, abrasives, wax, lubricants, thickening agents, nanoparticulate materials and mixtures thereof. Alternatively, the optional adjuncts may be added to the composition prior to the silicone oil addition, or alternatively at any later step in the process. In continuous process, the optional adjuncts may be introduced simultaneously with the silicone oil, or alternatively proceed addition of the silicone oil, or yet alternatively be added after the silicone oil.

The silicone dispersions are sufficiently robust to allow additional further processing and handling typical to a manufacturing or commercial process, such as pumping, fluid transfer, tank charging, batching, dispensing and filling operations generally employed to make, transfer, store and package compositions for distribution and use.

It is to be understood that other mixing processes, and the order in which the mixing steps are conducted, can be varied to some extent, and other processes known in the art employed to prepare the compositions of the present invention.

Method of Use

The stable dispersions of the present invention have a wide number of applications such as in automotive care applications, home care applications, personal care applications, industrial and institutional applications, pharmaceutical applications, textile applications, and the like. The inventive compositions can be used for treating a host of inanimate surfaces, including but not limited to hard and soft surfaces found throughout the interior and exterior of the household and automotive areas. Household surfaces on which the stable dispersions of the present invention can be used include floors, counter tops, furniture, walls and surfaces constructed of glass, plastic, fiberglass, laminates, such as Formica™ and Corian™, tile, porcelain, brick, concrete, limestone, grout, marble, granite as well as metallic surfaces such as aluminum, steel, stainless steel, iron, chrome, copper, brass and the like. Other household surfaces include carpet, upholstery, vinyl, leather, textiles, fabric, floors, walls, ceilings and wall finishes, such as wall paper, painted surfaces and panels. Automotive surfaces on which the stable dispersions of the present invention may be used include tires, rubber, vinyl, fabric, plastic and general elastomer surfaces found on the exterior and interior of a boat, vehicle, automobile, bus, car, plane, motorcycle and the like.

Method of Application

Compositions of the present invention may be applied to the target surface by a variety of means, including direct application by means of a spray, pump or aerosol dispensing means, or by other means, including the use of a carrier, or dilution system, as for example, but not limited to a wash, dip or immersion process. Regarding applications by use of a carrier, such suitable carriers include, for example, an impregnated wipe, foam, sponge, cloth, towel, tissue or paper towel or similar releasably absorbent carrier that enables the inventive compositions to be applied by direct physical contact and transferred from the carrier to the target surface, generally during a spreading, padding, rubbing or wiping operation. Combinations of a direct application, followed by a spreading, padding, rubbing or wiping operation performed with the aid of a foam, sponge, cloth, towel, tissue or paper towel, squeegee or similar wiping implement is also suitable for applying the compositions of the present invention.

Spray Dispensing

Compositions of the present invention may be also be sprayed directly onto the target surface and therefore are typically packaged in a spray dispenser. The spray dispenser can be any of the manually activated means for producing a spray of liquid droplets as is known in the art, e.g. trigger-type, pump-type, electrical spray, hydraulic nozzle, sonic nebulizer, high pressure fog nozzle, non-aerosol self-pressurized, and aerosol-type spray means. Automatic activated means can also be used herein. These type of automatic means are similar to manually activated means with the exception that the propellant is replaced by a compressor.

The spray dispenser can be an aerosol dispenser. Said aerosol dispenser comprises a container which can be constructed of any of the conventional materials employed in fabricating aerosol containers. The dispenser must be capable of withstanding internal pressure in the range of from about 5 to about 120 p.s.i.g. (pounds per square inch gas), more preferably from about 10 to about 100 p.s.i.g. The one important requirement concerning the dispenser is that it be provided with a valve member which will permit the inventive composition contained in the dispenser to be dispensed in the form of a spray of fine, or finely divided, particles or droplets. The aerosol dispenser utilizes a pressurized sealed container from which the inventive composition is dispensed through a special actuator/valve assembly under pressure. The aerosol dispenser is pressurized by incorporating therein a gaseous component generally known as a propellant. A more complete description of commercially available aerosol-spray dispensers appears in U.S. Pat. No. 3,436,772, Stebbins; and U.S. Pat. No. 3,600,325, Kaufman et al.; both of which are incorporated herein by reference.

Alternatively the spray dispenser can be a self-pressurized non-aerosol container having a convoluted liner and an elastomeric sleeve. Said self-pressurized dispenser comprises a liner/sleeve assembly containing a thin, flexible radially expandable convoluted plastic liner of from about 0.010 to about 0.020 inch thick, inside an essentially cylindrical elastomeric sleeve. The liner/sleeve is capable of holding a substantial quantity of the inventive composition and of causing said product to be dispensed. A more complete description of self-pressurized spray dispensers can be found in U.S. Pat. No. 5,111,971, Winer, and U.S. Pat. No. 5,232,126, Winer; both of which are herein incorporated by reference.

Another type of aerosol spray dispenser is one wherein a barrier separates the inventive composition from the propellant (preferably compressed air or nitrogen), as is disclosed in U.S. Pat. No. 4,260,110, incorporated herein by reference. Such a dispenser is available from EP Spray Systems, East Hanover, N.J.

More preferably, the spray dispenser is a non-aerosol, manually activated, pump-spray dispenser. Said pump-spray dispenser comprises a container and a pump mechanism which securely screws or snaps onto the container. The container comprises a vessel for containing the inventive composition to be dispensed. The pump mechanism comprises a pump chamber of substantially fixed volume, having an opening at the inner end thereof. Within the pump chamber is located a pump stem having a piston on the end thereof disposed for reciprocal motion in the pump chamber. The pump stem has a passageway there through with a dispensing outlet at the outer end of the passageway and an axial inlet port located inwardly thereof.

The container and the pump mechanism can be constructed of any conventional material employed in fabricating pump-spray dispensers, including, but not limited to: polyethylene; polypropylene; polyethyleneterephthalate; blends of polyethylene, vinyl acetate, and rubber elastomer. Other materials can include stainless steel. A more complete disclosure of commercially available dispensing devices appears in: U.S. Pat. No. 4,895,279, Schultz; U.S. Pat. No. 4,735,347, Schultz et al.; and U.S. Pat. No. 4,274,560, Carter; all of said references are herein incorporated by reference.

Most preferably, the spray dispenser is a manually activated trigger-spray dispenser. Said trigger-spray dispenser comprises a container and a trigger both of which can be constructed of any of the conventional material employed in fabricating trigger-spray dispensers, including, but not limited to: polyethylene; polypropylene; polyacetal; polycarbonate; polyethyleneterephthalate; polyvinyl chloride; polystyrene; blends of polyethylene, vinyl acetate, and rubber elastomer. Other materials can include stainless steel and glass. The trigger-spray dispenser does not incorporate a propellant gas. The trigger-spray dispenser herein is typically one which acts upon a discrete amount of the inventive composition itself, typically by means of a piston or a collapsing bellows that displaces the composition through a nozzle to create a spray of thin liquid. Said trigger-spray dispenser typically comprises a pump chamber having either a piston or bellows which is movable through a limited stroke response to the trigger for varying the volume of said pump chamber. This pump chamber or bellows chamber collects and holds the product for dispensing. The trigger spray dispenser typically has an outlet check valve for blocking communication and flow of fluid through the nozzle and is responsive to the pressure inside the chamber. For the piston type trigger sprayers, as the trigger is compressed, it acts on the fluid in the chamber and the spring, increasing the pressure on the fluid. For the bellows spray dispenser, as the bellows is compressed, the pressure increases on the fluid. The increase in fluid pressure in either trigger spray dispenser acts to open the top outlet check valve. The top valve allows the product to be forced through the swirl chamber and out the nozzle to form a discharge pattern. An adjustable nozzle cap can be used to vary the pattern of the fluid dispensed. For the piston spray dispenser, as the trigger is released, the spring acts on the piston to return it to its original position. For the bellows spray dispenser, the bellows acts as the spring to return to its original position. This action causes a vacuum in the chamber. The responding fluid acts to close the outlet valve while opening the inlet valve drawing product up to the chamber from the reservoir.

A more complete disclosure of commercially available dispensing devices appears in U.S. Pat. No. 4,082,223, Nozawa; U.S. Pat. No. 4,161,288, McKinney; U.S. Pat. No. 4,434,917, Saito et al.; U.S. Pat. No. 4,819,835, Tasaki; and U.S. Pat. No. 5,303,867, Peterson; all of said references are incorporated herein by reference. A broad array of trigger sprayers or finger pump sprayers are suitable for use with the compositions of this invention. These are readily available from suppliers such as Calmar, Inc., City of Industry, Calif.; CSI (Continental Sprayers, Inc.), St. Peters, Mo.; Berry Plastics Corp., Evansville, Ind.; or Seaquest Dispensing, Cary, Ill.

RESULTS AND DISCUSSION

Rheological Parameters

Without being bound by theory, it is believed that the systems of the present invention contain a sufficient concentration of dispersed particles or dispersed particle-like components to form a composition-spanning three-dimensional network at rest. Such a particle network can be formed by various types of structural building blocks, including, but not limited to, hydrated polymer molecules. Hydrated polymer molecules are commonly exhibited from a variety of partially water soluble or water or alkaline hydratable polymers, including, but not limited to, water-swellable and alkali-swellable polymers, copolymers and terpolymers, and biopolymers as described herein. For example, the loosely interconnected rigid rods formed by the helical regions of Xanthan gum in solution form are believed to form such composition-spanning three-dimensional networks.

A further property of these composition-spanning particle networks in the systems of the present invention is that they store energy elastically, that is to say reversibly, at small deformations, but break down and become flowable when the applied deformation exceeds a critical value. This is typical of moderately concentrated emulsions and dispersions, such as creamy salad dressing and ketchup. This is in contrast to thick, but Newtonian fluids, such as honey, which have no elastic response and flow under all conditions, however slowly this flow may be. This is also in contrast to elastic fluids, which are viscous and flow like a liquid under slow deformation, but are also elastic and behave like a springy solid under fast deformation, such as Silly Putty™.

The rheological behavior of the inventive systems can be identified and characterized by their viscoelastic response to an applied sinusoidal oscillation of either strain (displacement) or stress (force) at constant frequency. In a strain sweep, applied strain is varied and stress is measured, whereas in a stress sweep, applied stress is varied and strain is measured. The choice of experiment depends on the preference of the experimenter or on the type of rheometer available, but results are essentially equivalent between the two modes of measurement. In other words, if the output variables from a stress sweep are plotted as a function of strain, the resultant measured data curves should be comparable to those obtained from a strain sweep. Output variables include the magnitude of the complex modulus $G^*$ (the maximum stress amplitude divided by the maximum strain amplitude), the phase angle $\delta$ (the phase shift between strain and stress waves), the Elastic Modulus $G'$ and viscous modulus $G''$ (the in-phase and out-of phase components of $G^*$, or $|G^*|\cos\delta$ and $|G^*|\sin\delta$, respectively).

Critical Strain and Elastic Modulus Parameters

For systems of the present invention, which are stabilized by a particle network, the rheological variables are constant at small strains, but start to change when the strain exceeds a certain value called the Critical Strain value, or $\gamma_o$; in particular, the Elastic Modulus value $G'$ decreases and the phase angle $\delta$ increases above the Critical Stain value $\gamma_o$. At strains below the Critical Strain value $\gamma_o$ (defined as the linear viscoelastic region of the system), the network exhibits a consistent degree of elasticity, and stretches but does not break down. At strains above the Critical Strain value $\gamma_o$, the decrease in $G'$ and increase in $\delta$ signify breakdown of the particle network and initiation of dispersive flow. A further property of these network-stabilized systems is that the strain behavior just described is relatively invariant to the frequency of the oscillation. This is in contrast to elastic fluids, which may show strain behavior resembling that described above at high frequencies, while showing Newtonian behavior, where the rheological parameters reflect only viscous flow at all strains and $\gamma_o$ is undefined at low frequencies.

For systems of the present invention, the consistent elastic response at low strains relates to an ability to keep dispersed silicone oil droplets apart and in suspension, whereas a decrease in the elastic response with increasing energy input allows for the material to flow and release the silicone oil droplets. Note that the existence of a Critical Strain value implicates the existence of a linear viscoelastic region, and furthermore, that the value of $G'$ in the linear viscoelastic region must be greater than zero, since this parameter decreases outside of the linear viscoelastic region. The existence of a Critical Strain value that does not vanish (i.e. exhibit zero or negative value) at low frequency is therefore definitive of a dispersion with an at-rest structure that can trap and stabilize the silicone oil droplets.

A convenient way to rheologically characterize these network-stabilized systems of the current invention is by the Critical Strain value $\gamma_o$ and by the Elastic Modulus value $G'$ in the linear viscoelastic region. For the systems of the invention, the Critical Strain value ranges from greater than zero to about 0.5 (dimensionless units), and the Elastic Modulus value in the linear viscoelastic region ranges from greater than zero to about 400 Pascals. Typical examples of the instrumental sweeps and resultant data are shown in FIG. 1.

The Critical Strain value thus represents the degree to which the sample must be deformed in order to initiate structural breakdown. Without being bound by theory, it is believed to be reasonable to assume that the process of wiping the inventive dispersions onto a surface or wiping after application, results in a certain degree of localized strain at the surface, although the non-uniformity of both the compositions and the surfaces in question precludes making simple extrapolations to the bulk properties measured in the rheometer. Inventive dispersions with a Critical Strain value greater than zero and less than about 0.5 require only a minimal deformation force to rupture the dispersion and thereby allowing the silicone oil to become available for initial contact and subsequent wetting of and eventual partitioning and/or coating onto the target substrate, thereby resulting in the desired treatment characteristics of preserving, protecting, coating, and restoring appearance and shine to the treated substrate surfaces. Dispersions with a Critical Strain value greater than about 0.5 require an excessive deformation force, not typically achieved by manual forces associated with wiping actions, and are therefore less likely to allow the silicone oil droplets to make the initial contact with the surface that is necessary for silicone wetting to occur. The value of $G'$ in the linear viscoelastic region gives an indication of the ability of the network to resist structural rearrangement. It will be shown below that this value of $G'$ can be linked to the tendency of the network to hold its form under gravity.

Measurement Technique

Stress Sweeps were performed on the Stresstech High Resolution Rheometer, using the CC 25 cup and bob measuring system at 25° C., at a frequency of 1 Hz. Each sample was premixed by gently rotating the container upside down a few times. The sample was then carefully poured into the rheometer cup, and large bubbles were removed using a pipette. No other sample preparation or equilibration techniques were employed. Starting and ending stresses varied depending on the sample, and were adjusted to cover a sufficient stretch of both the linear viscoelastic region and the region of network break-down.

Particle size measurements were conducted on compositions of the present invention to determine average particle size distributions of the systems. Measurements were performed using a Nikon Model SMZ Light Microscope equipped with a Nikon digital camera, model DXM 1200F outfitted with the following: Objective Lens: HR Plan APO 1×WD 54; and Eyepiece Lens: C-W10×FN 22 (focal length 22 mm). Image processing was done using NI IMAQ Vision Builder 6.1 software with the digital picture input obtained from the Nikon microscope equipment using bright field backlighting. Results of image analysis showed that in general for the example embodiments presented here, average particle size distributions in the inventive compositions ranged between a average particle size distribution of about 5 microns (micrometer) to about 500 microns. Visually, example compositions ranged in clarity from turbid (milky white) to nearly transparent, or translucent in appearance, depending on the level of silicone oil present. The less turbid and more transparent compositions generally exhibited higher average particle size distributions above about 1000 nanometers.

Stability

It is worthwhile to address some observations and definitions related to physical stability of the inventive compositions, particularly in regard to phase separation and utility of use following either short-term or long-term storage, and/or storage under ambient conditions and/or stressful conditions of freezing, cold storage and/or heated storage, and the various combinations of conditions which the inventive compositions could likely experience with respect to actual use. The compositions of the present invention generally are found to remain macroscopically homogeneous (that is to say one continuous non-separating phase) over many months of storage, even following repeated freeze-thaw cycles and storage under usually adverse conditions including extended storage at close to freezing temperatures (35° F.) and elevated temperatures (120° F.) and combinations of these conditions. In some instances, compositions with Elastic Modulus values in the range above zero to about 10-20 Pascals visually showed reversible separation, typically into two phases with a diffuse boundary between the two phases, within days or weeks following initial preparation. However, these separated compositions were noted to be easily reconstituted, that is to say, able to recover their original physical and performance properties, by the simple process of shaking the separated compositions by hand, or inverting the container holding the separated composition one or several times. In some instances it is desirable to formulate the inventive compositions to have a short reversible phase separation as noted herein, for the purposes of novelty in appearance or as a reminder for users to shake before use. It should be noted that for all examples for which rheological measurements were made, the compositions were macroscopically homogeneous for the duration of the experiment. Hence, upon reconstitution, even previously separated compositions continue to exhibit the same values of the characteristic rheological parameters of the inventive compositions, the Critical Strain values and Elastic Modulus values as described herein.

Some embodiments of the inventive compositions with Elastic Modulus values below about 20 Pascals may reversibly separate into two phases and may require an extra step of mixing or shaking before use. Such embodiments may suitably be employed however since their functionality and useful properties are maintained and their physical homogeneity (single phase) is easily regenerated with brief shaking, stirring or mixing prior to use. Embodiments of the present invention include inventive compositions exhibiting rheological Elastic Modulus values over the range of greater than zero to about 400 Pascals. Further, some compositions with values in the range above zero to about 10-20 Pascals, which in some instances show reversible separation, may be suitably employed when it is desired to produce multiple phase compositions for applications where remixing of the reversibly separated compositions just prior to use is a desired attribute. An examples of such an embodiment includes but is not limited to an inventive compositions reversibly separating into two visually distinct liquid layers for appearance purposes and/or as a reminder for users to shake or remix prior to use. In general, compositions with values in the range above about 20 Pascals to about 400 Pascals remain homogeneous over a wide range of storage temperatures and storage conditions.

EXAMPLES

Examples of embodiments of the inventive compositions are provided in Table I, which presents data detailing measured rheological parameters from stress sweeps across a range of polymers and polymer levels in compositions having the indicated level of silicone oil present. Samples were prepared by low shear mixing of the silicone oil into the aqueous polymer solution, preformed and adjusted to near neutral pH in accordance to the batch mixing strategy described herein. The example compositions all exhibited suitable physical stability, and demonstrate the ability of the selected polymers to provide rheological structure to the inventive compositions sufficient to form stable silicone oil dispersions. Example No. 2 exhibited single phase stability for over ten months storage at 70° F., and over 1 month at 120° F. Example No. 3 exhibited single phase stability for about 1 day at 70° F., thereafter separating into two liquid phases. However, after gentle shaking by hand for about 5 seconds, the composition reformed into a single homogeneous liquid phase. Other examples presented in Table I all exhibited extended stability greater than about 5 months at room temperature.

TABLE I

| Example | Composition (1) | Polymer wt % (2) | Silicone Oil wt % (3) | Elastic Modulus (G') Pascals | Critical Strain (4) (γo) |
| --- | --- | --- | --- | --- | --- |
| 1 | Polymer A (5) | 0.56 | 6 | 4.1 | 0.04 |
| 2 | Polymer B (6) | 0.060 | 6 | 19 | 0.008 |
| 3 | Polymer K (7) | 0.07 | 6 | 2.4 | 0.3 |
| 4 | Polymer F2 (8) | 0.35 | 6 | 3.0 | 0.04 |

TABLE I-continued

| Example | Composition (1) | Polymer wt % (2) | Silicone Oil wt % (3) | Elastic Modulus (G') Pascals | Critical Strain (4) (γo) |
|---|---|---|---|---|---|
| 5 | Polymer Mix B, M (9) | 0.2 | 6 | 130 | 0.008 |
| 6 | Polymer Mix B, M (10) | 0.15 | 6 | 7.4 | 0.003 |
| 7 | Polymer B | 0.08 | 6 | 32 | 0.004 |
| 8 | Polymer B | 0.56 | 6 | 380 | 0.1 |
| 9 | Polymer J (11) | 0.052 | 7.5 | 19 | 0.004 |
| 10 | Polymer L (12) | 0.27 | 6 | 36 | 0.004 |

(1) Water comprises the balance of the composition, q.s. 100% total weight basis with approximately 0.4% triethanolamine present to adjust pH to about 7.
(2) Level of polymer on 100% active weight basis
(3) Dow Corning polydimethylsiloxane (PDMS) Silicone 200 fluid, 100% active weight basis
(4) Unitless parameter
(5) Acusol 830 alkali-swellable acrylic polymer - nonassociative Type (1) available from Rohm & Haas
(6) Carbopol EZ3 hydrophobically modified cross-linked polyacrylate powder available from Noveon
(7) Rhodopol T, a xanthan gum from Rhodia
(8) Ciba DP-HC-03-018 anionic alkali-swellable acrylic based polymer from Ciba Chemical
(9) Mixture of 0.10% by weight Carbopol EZ-3 from Noveon and 0.10% by weight Solagum SH210 from Seppic Inc.
(10) Mixture of 0.05% by weight Carbopol EZ-3 and 0.10% by weight Solagum
(11) Carbopol ETD 2691 lightly cross-linked polyacrylate polymer supplied as powder from Noveon
(12) Synergen Y02 polymer from Clariant Corporation Further examples (No.s 11 through 25) of embodiments of the inventive compositions are provided in Table II, which presents additional polymers suitable for use on hard surfaces, soft surfaces including fabrics, and automotive surfaces.

TABLE II

| Example | Composition (1) | Polymer wt % (2) | Silicone oil wt %(3) |
|---|---|---|---|
| 11 | Polymer A (4) | 0.28 | 3 |
| 12 | Polymer B (5) | 0.07 | 6 |
| 13 | Polymer B | 0.035 | 3 |
| 14 | Polymer C (6) | 0.5 | 9.5 |
| 15 | Polymer D (7) | 0.28 | 6 |
| 16 | Polymer E (8) | 0.45 | 6 |
| 17 | Polymer F1 (9) | 0.54 | 6 |
| 18 | Polymer F2 (10) | 0.57 | 6 |
| 19 | Polymer G (11) | 0.6 | 6 |
| 20 | Polymer H (12) | 0.07 | 6 |
| 21 | Polymer I (13) | 0.25 | 6 |
| 22 | Polymer I | 0.07 | 6 |
| 23 | Polymer J (14) | 0.07 | 6 |
| 24 | Polymer J (15) | 0.16 | 10.62 |
| 25 | Polymer J (16) | 0.16 | 16.62 |

(1) Water comprises the balance of the composition, q.s. 100% total weight basis with approximately 0.4% triethanolamine present to adjust pH to about 7.
(2) Level of polymer on 100% active weight basis
(3) Dow Corning Silicone 200 fluid
(4) Acusol 830
(5) Carbopol EZ3
(6) Neutralized Solagum 306 liquid dispersion polymer available from Seppic Inc.
(7) Ciba DP-HC-01-001 anionic liquid dispersion polymer with activating surfactant available from Ciba Chemicals
(8) Ciba Rheovis ATN anionic alkali-swellable acrylic based, non-associative polymer
(9) Ciba DP-HC-03-012 anionic alkali-swellable acrylic based associative Type (1) polymer
(10) Ciba DP-HC-03-018
(11) Ciba Rheovis ATA hydrophobically modified alkali swellable polymer
(12) Pemulin 1622 cross-linked copolymer of acrylic acid and C10-30 alkyl acrylate available from Noveon
(13) Carbopol 934 polyacrylate powder available from Noveon.
(14) Carbopol ETD 2691
(15) Silicone oil mixture of Dow Corning DC-200 (30,000 cst) and Dow Corning wetting agent Q2-5211 present at 0.12%
(16) Silicone oil mixture of Dow Corning DC-200 (350 cst) and Dow Corning wetting agent Q2-5211 present at 0.12%

Additional examples (No.s 16-31) of embodiments of the inventive compositions are provided in Table III, which presents example compositions suitable for use as a hard surface treating composition, particularly for cleaning and protecting metal surfaces found throughout a kitchen, such as stainless steel, aluminum and chrome surfaces.

TABLE III

| Ingredient (1) | Ex. 26 | Ex. 27 | Ex. 28 | Ex. 29 | Ex. 30 | Ex. 31 |
|---|---|---|---|---|---|---|
| Polymer A (2) | 0.50 | | | | | |
| Polymer B (3) | | 0.50 | | | | |
| Polymer J (4) | | | 0.05 | 0.05 | 0.05 | 0.05 |
| Triethanoloamine (5) | 0.05 | 0.05 | 0.05 | 0.05 | 0.05 | 0.05 |
| Silicone Oil A (6) | 8 | 8 | | | | 4 |
| Silicone Oil B (7) | | | 0.25-6 | | 0.25-6 | |
| Silicone Oil C (8) | | | | 1-4 | 0-4 | 0-4 |
| Glycol ether solvent (9) | | | | 1-5 | 1-5 | 1-5 |
| Spreading Agent (10) | 0.1-2.0 | 0.1-0.2 | 0.1-2.0 | 0.1 | 0.1-0.2 | 0.1 |
| Preservative (11) | 0.1 | 0.1 | 0.1 | 0.1 | 0.1 | 0.1 |
| Fragrance Oil (12) | 0.01 | 0.01 | 0.01 | 0.01 | 0.01 | 0.01 |
| Water (13) | q.s. | q.s. | q.s. | q.s. | q.s. | q.s. |

(1) Ingredients expressed as % by weight on 100% active basis unless noted. Water represents balance of composition (q.s.) to 100%.
(2) Acusol 830
(3) Carbopol EZ3

TABLE III-continued

| Ingredient (1) | Ex. 26 | Ex. 27 | Ex. 28 | Ex. 29 | Ex. 30 | Ex. 31 |
|---|---|---|---|---|---|---|

(4) Carbopol ETD 2691
(5) Base for pH adjustment to pH 6 to 8
(6) SF 1550, a polyphenylmethoylsiloxane from General Electric
(7) DC 200 of 350 cst viscosity. Lower-upper values of wt % range of ingredient in example compositions indicated.
(8) Volatile silicone oil DC 245, available from Dow Corning. Range of values in 1% increments
(9) Dowanol EB, available from Dow Chemical. Range of values in 1% increments
(10) Silwet 7280, available from General Electric, DC56 from Dow Corning for Examples 26 and 28. Lower-upper values of wt % range of ingredient in example compositions indicated.
(11) Dantogard Plus, available from the Lonza Company
(12) Commercially available fragrance oil concentrate from Givaudan-Roure
(13) Purified water with low hardness ion content Additional examples (No.s 32-38) of embodiments of the inventive compositions are provided in Table IV, which presents example compositions suitable for use as an elastomeric surface treating composition, particularly for automotive vinyl and rubber (tire) surfaces. Ex. 38 is an aerosol version of Ex. 37 including a propellant. The example compositions were sprayed using a manual trigger pump sprayer producing fine droplets onto vinyl and rubber substrates, wiped with a soft cloth to spread the composition and remove excess liquid. The aerosol version was packaged in a pressurized metal can employing a dispensing valve. Resulting surfaces exhibited a clean and shiny surface that was non-greasy to touch.

TABLE IV

| Ingredient (1) | Ex. 32 | Ex. 33 | Ex. 34 | Ex. 35 | Ex. 36 | Ex. 37 | Ex. 38 |
|---|---|---|---|---|---|---|---|
| Polymer A (2) | 0.09 | | | | | | |
| Polymer B (3) | | 0.08 | 0.09 | 0.10 | 0.05 | | |
| Polymer J (4) | | | | | | 0.05 | 0.25 | 0.25 |
| Morpholine (5) | 0.05 | 0.05 | 0.05 | 0.05 | 0.05 | 0.04 | 0.04 |
| Silicone Oil A (6) | 8 | 8 | 8 | 8 | 8 | 8 | 8 |
| Silicone Oil B (7) | | | | | | 1 | 1 |
| Mineral Spirits (8) | 2.5 | 2.5 | 2.5 | 2.5 | 2.5 | 2.5 | 2.5 |
| Spreading Agent (9) | | | | 0.03 | 0.03 | 0.05 | 0.05 |
| Propellant (10) | | | | | | | 10 |
| Preservative (11) | 0.1 | 0.1 | 0.1 | 0.1 | 0.1 | 0.1 | 0.1 |
| Fragrance Oil (12) | 0.01 | 0.01 | 0.01 | 0.01 | 0.01 | 0.01 | 0.01 |
| Water (13) | q.s. | q.s. | q.s. | q.s. | q.s. | q.s. | q.s. |

(1) Ingredients expressed as % by weight on 100% active basis unless noted. Water represents balance of composition (q.s.) to 100% by weight.
(2) Acusol 830
(3) Carbopol EZ3
(4) Carbopol ETD 2691
(5) Base for pH adjustment to about pH 7.2
(6) DC 200 PDMS fluid of 30,000 cst viscosity
(7) DC 200 PDMS fluid of 350 cst viscosity
(8) Odorless mineral spirits available from NOCO Energy Corporation
(9) Silicone Q2-5211, a super spreader from Dow Chemical
(10) Propellant A-108 available from Shell Gas Company
(11) Dantogard Plus, available from the Lonza Company
(12) Commercially available fragrance oil concentrate from Givaudan-Roure
(13) Deionized water Additional examples (No.s 39-42) of embodiments of the inventive compositions are provided in Table V, which presents example compositions suitable for use as cleaning and waxing compositions particularly suited for painted surfaces such as vehicle exteriors. The example compositions were sprayed onto lightly abraded (representative of environmental exposure and normal wear and tear) clear coated gloss black painted metal surfaces in the form of approximately 1 foot by 2 foot rectangular coupons that had been previously rinsed with tap water without drying. Compositions were then uniformly wiped across the coupon surfaces using a damp sponge and the coupons rinsed with additional tap water and dried using a soft cloth towel. The treated surfaces exhibited a clean and shiny character and readily beaded water. Further, fine scratches on the treated surfaces appeared much less noticeable to the eye, effectively restoring their appearance much closer to an original non-abraded control. The rheological parameters of the example compositions are all within the ranges characteristic of the inventive compositions. For example, Theological measurement of Ex. 40 yielded a Critical Strain value of 0.005 and an Elastic Modulus value of 190 Pa.

TABLE V

| Ingredient | Ex. 39 | Ex. 40 | Ex. 41 | Ex. 42 |
|---|---|---|---|---|
| Polymer B (1) | 0.2 | 0.20 | 0.20 | 0.20 |
| Triethanolamine (2) | 0.25 | 0.25 | 0.25 | 0.25 |
| Silicone Resin (3) | 0.2 | 0.2 | 0.1 | 0.1 |
| Silicone Oil (4) | 0.86 | 0.86 | 0.86 | 0.86 |
| Carnauba Wax (5) | — | 2.0 | 2.0 | 4.0 |
| Spreading Agent (6) | 0.4 | 0.4 | 0.4 | 0.4 |
| Titanium Dioxide (7) | — | 0.02 | 0.04 | 0.04 |
| Preservative (8) | 0.1 | 0.1 | 0.1 | 0.1 |
| Fragrance Oil (9) | 0.01 | 0.01 | 0.01 | 0.01 |
| Water (10) | q.s. | q.s. | q.s. | q.s. |

(1) Carbopol EZ3
(2) Base for pH adjustment to about pH 7, available from Univar
(3) Dow Corning DC 2-1912
(4) DC 200 PDMS fluid of 500 cst viscosity
(5) Aqueous emulsion with 22% solids content from Knapp Inc.
(6) DC Q2-5211
(7) Opacifying colorant pigment from Degussa Corporation
(8) Dantogard Plus
(9) Fragrance concentrate from Givaudan-Roure
(10) Deionized water, q.s. to 100% balance Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

We claim:

1. An aqueous dispersion comprising:
   i. an organopolysiloxane fluid comprising at least two polydimethylsiloxanes with different viscosities;
   ii. a polymer selected from the group consisting of methylcellulose, hydroxypropyl methyl cellulose, hydroxypropyl ethyl cellulose, dextrin, maltodextrin, polyvinyl alcohol, polyvinyl alcohol copolymers, xanthan gum, starch and mixtures thereof;
   iii. an additional polymer selected from the group consisting of polyacrylate polymers and copolymers which have a molecular weight of about 5,000 to about 5,000,000 g/mol;
   iv. at least 95 percent by weight water; and
   v. a propellant.

2. The aqueous dispersion of claim 1, wherein said polyorganosiloxane fluid comprises at least one silicone oil having the general formula:

$$(R_nSiO_{((4-n)/2)})_m;$$

wherein n is between 0 and 3 and; wherein m is 2 or greater; and wherein R is selected from the group consisting of alkyl, alkylene, allyl, aryl, benzyl, phenyl, amine, amide, vinyl, fluoroalkyl, perfluoroalkane, carboxyester and quaternary alkyl ammonium radicals, and mixtures thereof.

3. The aqueous dispersion of claim 2, wherein at least one polydimethylsiloxane has a fluid viscosity of between about 1 centistokes and about 4,000,000 centistokes.

4. The aqueous dispersion of claim 2, wherein m is between 2 and about 5000.

5. The aqueous dispersion of claim 2, wherein said polyorganosiloxane fluid comprises a volatile silicone fluid with a viscosity of less than 10 centistokes at 25° C.

6. The aqueous dispersion of claim 1, wherein said polyorganosiloxane fluid is present at a level between about 0.01 weight percent and 20 weight percent of said composition aqueous dispersion.

7. The aqueous dispersion of claim 1, wherein said additional polymer is selected from the group consisting of polyacrylate polymers and copolymers containing at least one acrylate monomer, water swellable and alkali swellable polyacrylate polymers and copolymers containing at least one acrylate monomer, non-linear polyacrylate polymers cross-linked with at least one polyalkenyl polyether monomer, film-forming and water swellable non-soluble polyacrylate polymers, hydrophobically modified cross-linked polyacrylate polymers and copolymers containing at least one hydrophobic monomer, water dispersible associative and non-associative polyacrylate polymers and copolymers containing at least one acrylate monomer, and mixtures thereof.

8. The aqueous dispersion of claim 1, wherein said polymer and additional polymer together, are present at a level between about 0.0001 weight percent and 10 weight percent of said composition aqueous dispersion.

9. The aqueous dispersion of claim 1, wherein said polymer and additional polymer together, are present at a level between about 0.001 weight percent and 5 weight percent of said composition aqueous dispersion.

10. The aqueous dispersion of claim 1, wherein said polymer and additional polymer together, are present at a level between about 0.01 weight percent and 1 weight percent of said composition aqueous dispersion.

11. The aqueous dispersion of claim 1, wherein said weight ratio of said polyorganosiloxane fluid (a) to said polymer and additional polymer together (b) is between 500:1 (a:b) and 1:1.

12. The aqueous dispersion of claim 1, wherein said weight ratio of said polyorganosiloxane fluid (a) to said polymer and additional polymer together (b) is between about 250:1 to about 1:1.

13. The aqueous dispersion of claim 1, wherein said weight ratio of said polyorganosiloxane fluid (a) to said polymer and additional polymer together (b) is between about 100:1 to about 1:1.

14. The aqueous dispersion of claim 1, wherein said aqueous dispersion further comprises a thickener at a level of about 0.01 percent to about 10 percent by weight of the aqueous dispersion.

15. The aqueous dispersion of claim 1, wherein said aqueous dispersion further comprises a thickener at a level of about 0.10 percent to about 10 percent by weight of the aqueous dispersion.

16. The aqueous dispersion of claim 1, wherein said aqueous dispersion further comprises a thickener at a level of about 0.01 percent to about 5 percent by weight of the aqueous dispersion.

17. The aqueous dispersion of claim 1, further comprising optional adjuncts selected from the group consisting of solvents, surfactants, surface wetting agents, spreading agents, stabilizers, ultraviolet absorbers, ultraviolet light scatterers, ultraviolet blockers, hindered amine light stabilizers, free radical inhibitors, excited state quenchers, pigments, dyes, coloring agents, preservatives, microbiocides, fungicides, plasticizers, buffers, pH adjusting acids, bases and their conjugate salts, fragrances, polishes, abrasives, wax, lubricants, thickening agents, nanoparticulate materials and mixtures thereof.

18. A method of cleaning, preserving, protecting and otherwise treating a surface, comprising the steps of:
  i. applying an effective amount of an aqueous dispersion to said surface, wherein said surface comprises a surface selected from the group consisting of a hard surface, an elastomeric surface, a painted surface, a metal surface and combinations thereof;
  ii. distributing said aqueous dispersion onto said surface with an application implement;
wherein said aqueous dispersion comprises:
  a. an organopolysiloxane fluid comprising at least two polydimethylsiloxanes with different viscosities;
  b. a water soluble or water dispersible polymer;
  c. at least 95 percent by weight water;
  d. an additional polymer selected from the group consisting of polyacrylate polymers and copolymers which have a molecular weight of about 5,000 to about 5,000,000 g/mol; and
  e. a propellant;
and wherein said aqueous dispersion, in the absence of a propellant, exhibits a rheological Critical Strain value greater than zero and less than about 0.5 and an Elastic Modulus value greater than zero and less than about 400 Pascals.

19. A method according to claim 18 wherein said application implement comes into direct contact with said surface, and wherein said application implement is selected from the group consisting of a wipe, woven substrate, non-woven substrate, sponge, towelette, pad, foam and/or porous material and/or combination, and wherein said application implement is substantially wetted by said aqueous dispersion.

20. A method according to claim 18 wherein said application implement does not come into direct contact with said surface, and wherein said application implement is selected from the group consisting of a spray device, atomizing device, aerosol device, foam generating device, electrostatic spray device, nebulizer device and/or device and or combinations thereof that produces liquid droplets of said aqueous dispersion, and wherein said application implement is capable of applying said liquid droplets onto said surface.

21. A method according to claim 18 further comprising the step (iii) of removing excess aqueous dispersion form the surface following step (i) or step (ii).

22. A method according to claim 21 whereby said step (iii) of removing excess aqueous dispersion from the surface comprises use of said application implement.

23. A method according to claim 21 whereby said step (iii) of removing excess aqueous dispersion form the surface comprises the use of an aqueous rinse comprising water.

24. A method according to claim 21 further comprising the step (iv) of rinsing said surface with an aqueous rinse comprising water.

* * * * *